United States Patent
You et al.

(10) Patent No.: US 11,252,713 B2
(45) Date of Patent: Feb. 15, 2022

(54) DOWNLINK CONTROL INFORMATION RECEIVING METHOD AND USER EQUIPMENT, AND DOWNLINK CONTROL INFORMATION TRANSMITTING METHOD AND BASE STATION

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/841,765

(22) Filed: Apr. 7, 2020

(65) Prior Publication Data
US 2020/0236664 A1 Jul. 23, 2020

Related U.S. Application Data

(63) Continuation of application No. 15/738,736, filed as application No. PCT/KR2016/007892 on Jul. 20, 2016, now Pat. No. 10,652,872.

(Continued)

(51) Int. Cl.
*H04L 5/00* (2006.01)
*H04W 74/08* (2009.01)
(Continued)

(52) U.S. Cl.
CPC ......... *H04W 72/042* (2013.01); *H04L 1/0036* (2013.01); *H04L 1/0079* (2013.01);
(Continued)

(58) Field of Classification Search
CPC ........... H04W 72/024; H04W 74/0833; H04W 74/08; H04W 88/06; H04L 1/0091; H04L 1/0079; H04L 1/0036; H04L 5/00
See application file for complete search history.

(56) References Cited

U.S. PATENT DOCUMENTS

2013/0195041 A1 8/2013 Papasakellariou et al.
2014/0098761 A1* 4/2014 Lee .................. H04W 24/02
370/329
(Continued)

FOREIGN PATENT DOCUMENTS

CN 103220795 A 7/2013
CN 103929266 A 7/2014
WO WO 2015/012654 A1 1/2015

OTHER PUBLICATIONS

Huawei et al., "DCI and Resource Allocation for MTC UE," 3GPP TSG RAN WG1 Meeting #81, R1-153211, Fukuoka, Japan, May 25-29, 2015, 4 pages.

(Continued)

*Primary Examiner* — Robert C Scheibel
(74) *Attorney, Agent, or Firm* — Birch, Stewart, Kolasch & Birch, LLP

(57) ABSTRACT

A method for a user equipment (UE) in a wireless communication system includes determining a coverage enhancement (CE) mode, wherein the CE mode is determined as one of a plurality of predetermined CE modes, wherein the plurality of predetermined CE modes comprise CE mode A and CE mode B; receiving downlink control information (DCI) related to scheduling a data channel, wherein a format of the DCI is related to the CE mode; and communicating the data channel based on the DCI. Further, determining the CE mode includes based on information related to indicating the CE mode being received, determining the CE mode as identical to the CE mode indicated based on the information.

11 Claims, 8 Drawing Sheets

Related U.S. Application Data

(60) Provisional application No. 62/254,173, filed on Nov. 11, 2015, provisional application No. 62/246,579, filed on Oct. 26, 2015, provisional application No. 62/243,654, filed on Oct. 19, 2015, provisional application No. 62/204,464, filed on Aug. 13, 2015, provisional application No. 62/194,785, filed on Jul. 20, 2015.

(51) Int. Cl.
*H04W 88/06* (2009.01)
*H04W 72/04* (2009.01)
*H04L 1/00* (2006.01)

(52) U.S. Cl.
CPC .............. *H04L 1/0091* (2013.01); *H04L 5/00* (2013.01); *H04W 74/08* (2013.01); *H04W 74/0833* (2013.01); *H04W 88/06* (2013.01)

(56) References Cited

U.S. PATENT DOCUMENTS

| | | | |
|---|---|---|---|
| 2015/0016312 A1 | 1/2015 | Li et al. | |
| 2016/0073381 A1* | 3/2016 | Ratasuk | H04W 4/70 370/329 |
| 2016/0081065 A1* | 3/2016 | Shi | H04W 74/0833 370/329 |
| 2016/0100422 A1* | 4/2016 | Papasakellariou | H04L 1/1861 370/329 |
| 2016/0270038 A1* | 9/2016 | Papasakellariou | H04L 1/18 |
| 2017/0078830 A1* | 3/2017 | Wu | H04W 4/70 |
| 2017/0265174 A1* | 9/2017 | Wang | H04W 72/042 |
| 2017/0346607 A1* | 11/2017 | Chen | H04W 72/14 |
| 2018/0213484 A1* | 7/2018 | Oh | H04W 52/42 |

OTHER PUBLICATIONS

Huawei et al., "How to Have Different Behavior Depending on Coverage Enhancement," 3GPP TSG RAN WG1 Meeting #81, R1-153206, Fukuoka, Japan, May 25-29, 2015, 5 pages.

KDDI Corporation, "Discussion on Configuration of Coverage Enhancement Level," 3GPP TSG RAN WG1 Meeting #81, R1-153152, Fukuoka, Japan, May 25-29, 2015, 3 pages.

Nokia Networks, "PDSCH Coverage Enhancement Techniques," 3GPP TSG-RAN WG1 Meeting #81, R1-152544, Fukuoka, Japan, May 25-29, 2015, 3 pages.

Panasonic, "DCI Design for Rel.13 MTC," 3GPP TSG RAN WG1 Meeting #81, R1-152907, Fukuoka, Japan, May 25-29, 2015, pp. 1-3.

Samsung, "DCI Formats for Low Cost UEs," 3GPP TSG RAN WG1 #80bis, R1-151583, Belgrade, Serbia, Apr. 20-24, 2015, pp. 1-3.

* cited by examiner

DOWNLINK CONTROL INFORMATION RECEIVING METHOD AND USER EQUIPMENT, AND DOWNLINK CONTROL INFORMATION TRANSMITTING METHOD AND BASE STATION

CROSS-REFERENCE TO RELATED APPLICATIONS

This Application is a Continuation of U.S. patent application Ser. No. 15/738,736, now U.S. Pat. No. 10,652,872 filed on Dec. 21, 2017, which is the National Phase of PCT International Application No. PCT/KR2016/007892 filed on Jul. 20, 2016, which claims the priority benefit under 35 U.S.C. § 119(e) to U.S. Provisional Application Nos. 62/254,173 filed on Nov. 11, 2015, 62/246,579 filed on Oct. 26, 2015, 62/243,654 filed on Oct. 19, 2015, 62/204,464 filed on Aug. 13, 2015 and 62/194,785 filed on Jul. 20, 2015, all of which are hereby expressly incorporated by reference into the present application.

BACKGROUND OF THE INVENTION

Field of the Invention

The present invention relates to a wireless communication system and, more particularly, to a method for transmitting or receiving downlink control and an apparatus therefor.

Discussion of the Related Art

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

SUMMARY OF THE INVENTION

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

According to an aspect of the present invention, provided herein is a method of receiving downlink control information (DCI) by a user equipment (UE), including determining a coverage enhancement (CE) mode of the UE; decoding a downlink (DL) grant DCI; and receiving a physical downlink shared channel (PDSCH) according to the DL grant DCI. The DL grant DCI may be decoded according to a first DCI format when the CE mode of the UE is CE Mode A and the DL grant DCI may be decoded according to a second DCI format when the CE mode of the UE is CE Mode B.

In another aspect of the present invention, provided herein is a user equipment (UE) for receiving downlink control information (DCI), including a radio frequency (RF) unit, and a processor connected to the RF unit. The processor may be configured to determine a coverage enhancement (CE) mode of the UE; decode a downlink (DL) grant DCI; and control the RF unit to receive a physical downlink shared channel (PDSCH) according to the DL grant DCI. The processor may decode the DL grant DCI according to a first DCI format when the CE mode of the UE is CE Mode A and decode the DL grant DCI according to a second DCI format when the CE mode of the UE is CE Mode B.

In another aspect of the present invention, provided herein is a method of transmitting downlink control information (DCI) to a user equipment (UE) by a base station (BS), including determining a coverage enhancement (CE) mode of the UE; transmitting a downlink (DL) DCI to the UE; and transmitting a physical downlink shared channel (PDSCH) to the UE according to the DL grant DCI. The DL grant DCI may be transmitted according to a first DCI format when the CE mode of the UE is CE Mode A and the DL grant DCI may be transmitted according to a second DCI format when the CE mode of the UE is CE Mode B.

In another aspect of the present invention, provided herein is a base station (BS) for transmitting downlink control information (DCI) to a user equipment (UE) including a radio frequency (RF) unit, and a processor connected to the RF unit, wherein the processor is configured to determine a coverage enhancement (CE) mode of the UE; control the RF unit to transmit a downlink (DL) DCI to the UE; and control the RF unit to transmit a physical downlink shared channel (PDSCH) to the UE according to the DL grant DCI. The processor may generate DL grant DCI according to a first DCI format when the CE mode of the UE is CE Mode A and generate the DL grant DCI according to a second DCI format when the CE mode of the UE is CE Mode B.

In each aspect of the present invention, the first DCI format and the second DCI format may be different in at least a physical resource block (PRB) assignment field for DL reception, a hybrid automatic repeat request (HARQ) process number field, a transmit power control (TPC) command field for a physical uplink control channel (PUCCH), or a redundancy version (RV) field.

In each aspect of the present invention, the first DCI format may include the PRB assignment field for DL reception, the HARQ process number field, the TPC command for the PUCCH, and the RV field. The PRB assignment field for DL reception, the HARQ process number field, the TPC command field for the PUCCH, or the RV field may not be included in the second DCI format or may be shorter than in the first DCI format.

In each aspect of the present invention, the UE may decode uplink (UL) grant DCI and transmit a physical uplink shared channel (PUSCH) according to the UL grant DCI.

In each aspect of the present invention, the UE may decode the UL grant DCI according to a third DCI format when the CE mode of the UE is CE Mode A and decode the UL grant DCI according to a fourth DCI format when the CE mode of the UE is CE Mode B.

In each aspect of the present invention, the BS may transmit uplink (UL) grant DCI to the UE and receive a physical uplink shared channel (PUSCH) according to the UL grant DCI.

In each aspect of the present invention, the BS may transmit the UL grant DCI according to a third DCI format when the CE mode of the UE is CE Mode A and transmit the UL grant DCI according to a fourth DCI format when the CE mode of the UE is CE Mode B.

In each aspect of the present invention, the third DCI format and the fourth DCI format may be different in at least a PRB assignment field for UL transmission, a TPC command field for a scheduled PUSCH, a channel state information (CSI) request field, or a sounding reference signal (SRS) request field.

In each aspect of the present invention, the third DCI format may include the PRB assignment field for UL transmission, the TPC command field for the scheduled PUSCH, the CSI request field, and the SRS field.

In each aspect of the present invention, the PRB assignment field for UL transmission, the TPC command field for the scheduled PUSCH, the CSI request field, or the SRS field may not be included in the fourth DCI format or may be shorter than in the third DCI format.

In each aspect of the present invention, the CE mode of the UE may be determined to be a CE mode corresponding to a physical random access channel (PRACH) resource used by the UE in a successful random access procedure.

In each aspect of the present invention, the CE mode of the UE may be determined to be a CE mode configured by the BS.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a low-price/low-cost UE can communicate with a BS while maintaining compatibility with a legacy system.

According to an embodiment of the present invention, a UE can be implemented with low price/low cost.

According to an embodiment of the present invention, coverage can be enhanced.

According to an embodiment of the present invention, a UE and an eNB can communicate in a narrowband.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

Figure 1:
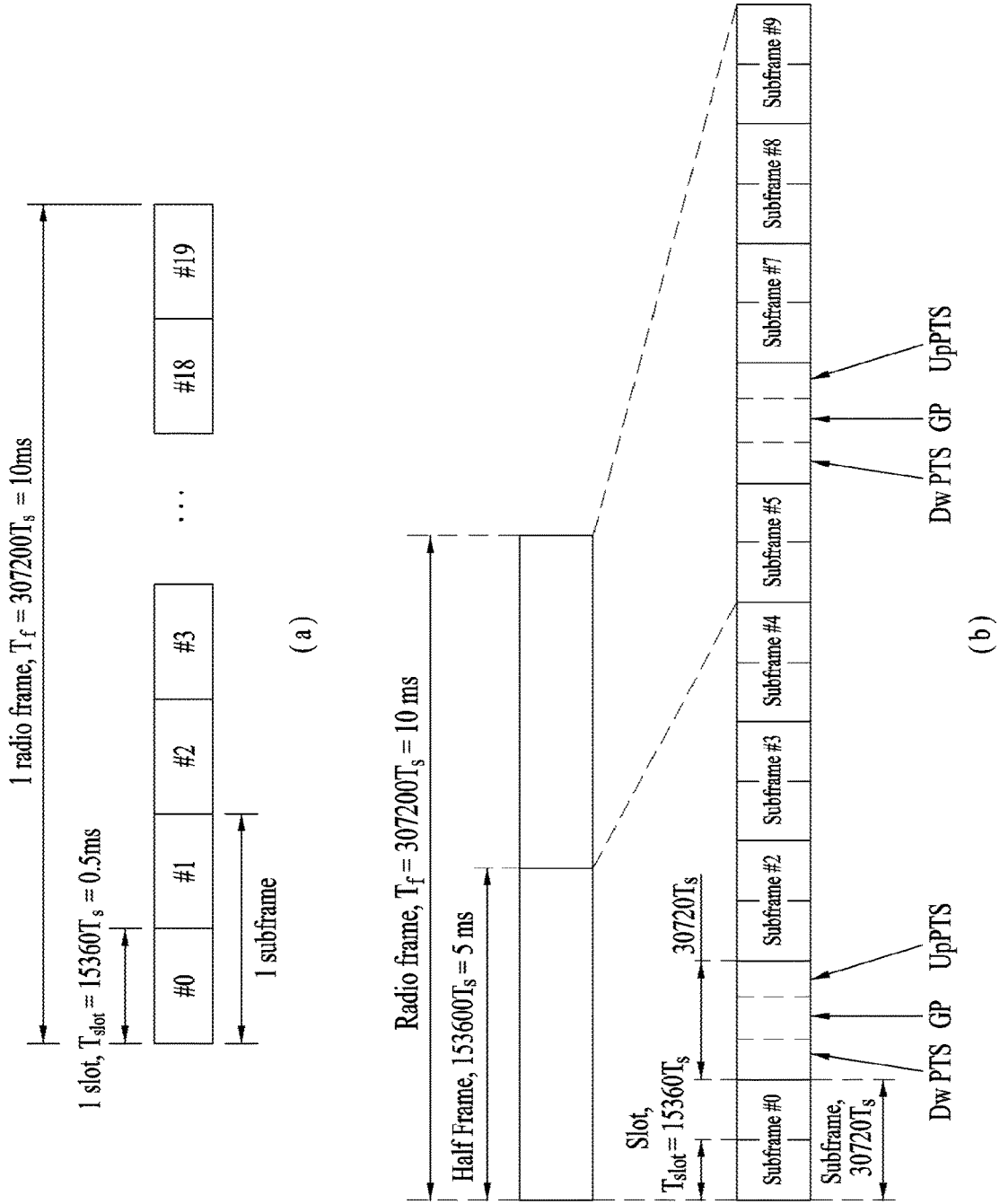
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, anode refers to a fixed point capable of transmitting/receiving a radio signal through communication with a UE. Various types of eNBs may be used as nodes irrespective of the terms thereof. For example, a BS, anode B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or anode which provides a communication service to the specific cell. Anode providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

(UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in down | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | — | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 2:
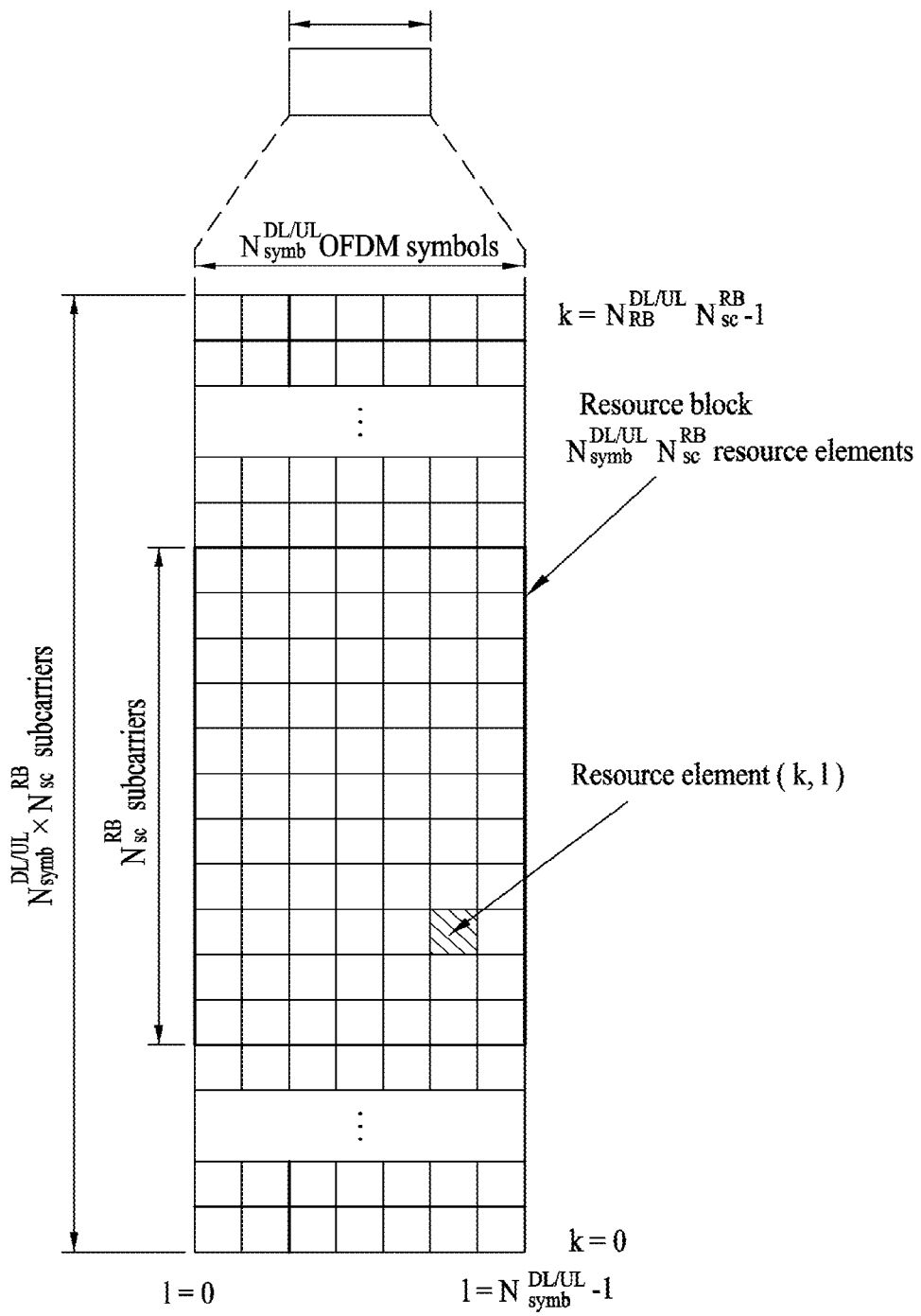
FIG. 2 illustrates the structure of a downlink (DL)/uplink (UL) slot in a wireless communication system.

In Table 1, D denotes a DL subframe, U denotes a UL subframe, and S denotes a special subframe. The special subframe includes three fields, i.e. downlink pilot time slot (DwPTS), guard period (GP), and uplink pilot time slot FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12)

consecutive subcarriers in the frequency domain. For reference, a resource composed of one OFDM symbol and one subcarrier is referred to a resource element (RE) or tone. Accordingly, one RB includes $N^{DU/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DU/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
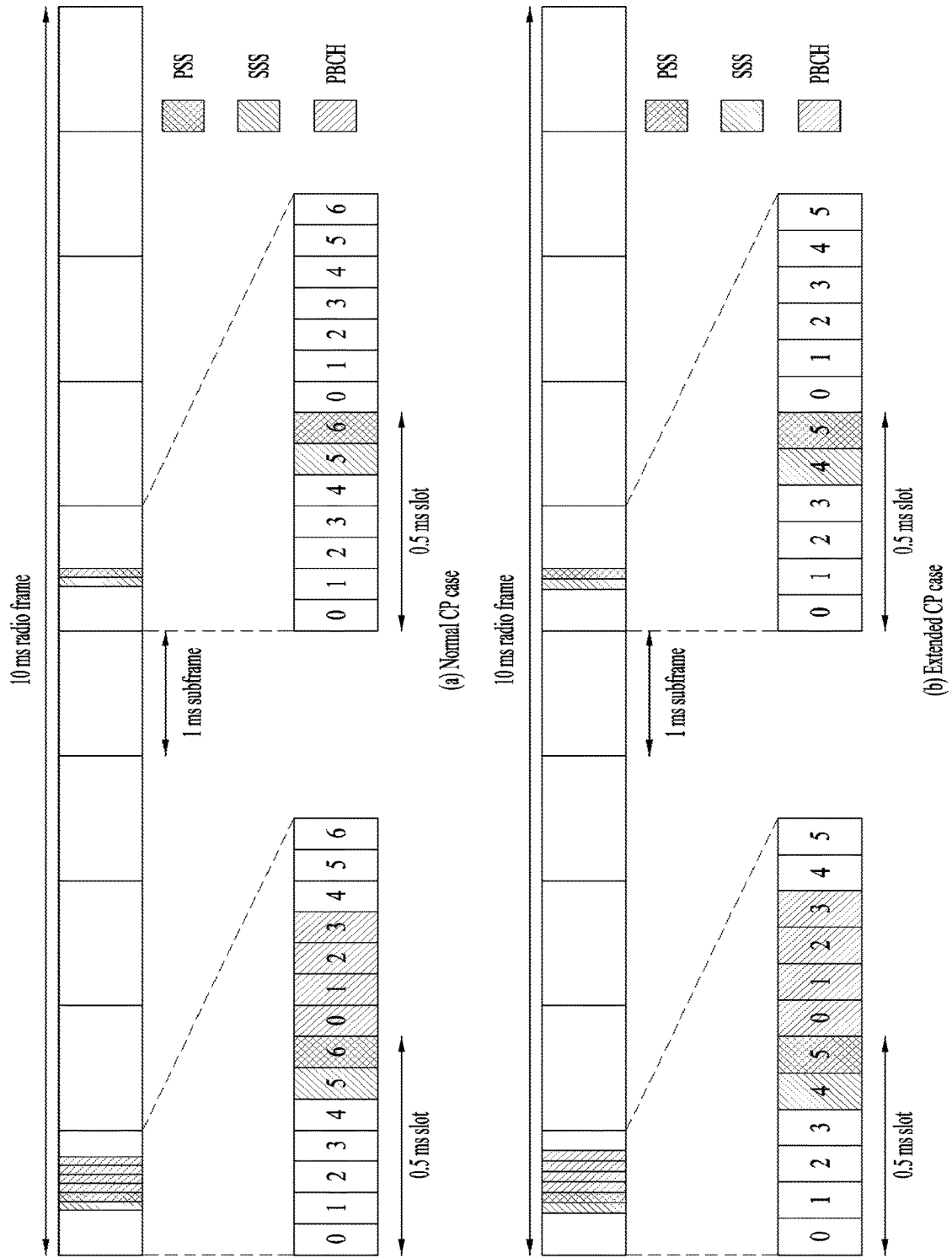
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, messages transmitted in Step 0 to Step 2 may be referred to as Msg0 to Msg2, respectively. Although not illustrated, UL transmission (i.e., Step 3) corresponding to an RAR as a part of the random access procedure may be performed. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

The random access preamble, i.e., RACH preamble consists of a cyclic prefix of length $T_{CP}$ and a sequence part of length $T_{SEQ}$ in the physical layer. $T_{CP}$ and $T_{SEQ}$ depend on the frame structure and the random access configuration. The preamble format is controlled by higher layers. The following table shows examples of $T_{CP}$ and $T_{SEQ}$.

TABLE 3

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see NOTE) | $448 \cdot T_s$ | $4096 \cdot T_s$ |

NOTE:
Frame structure type 2 and special subframe configuration with UpPTS lengths $4384 \cdot T_s$ and $5120 \cdot T_s$ only.

The random access preamble is transmitted in UL subframe(s). The transmission of a random access preamble is restricted to certain time and frequency resources. These resources are called PRACH resources. The PRACH resources, are enumerated in increasing order of the subframe number within the radio frame and the PRBs in the frequency domain such that index 0 correspond to the lowest numbered PRB and subframe within the radio frame. PRACH resources within the radio frame are indicated by a PRACH configuration index.

For frame structure type 1 with preamble format 0-3, for each of the PRACH configurations there is at most one random access resource per subframe. The following table shows examples of the preamble formats and the subframes in which random access preamble transmission is allowed for a given configuration in frame structure type 1. The PRACH configuration index is given by a higher layer signal (transmitted by an eNB).

TABLE 4

| PRACH Configuration Index | Preamble Format | SFN | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1,6 |
| 7 | 0 | Any | 2,7 |
| 8 | 0 | Any | 3,8 |
| 9 | 0 | Any | 1,4,7 |
| 10 | 0 | Any | 2,5,8 |
| 11 | 0 | Any | 3,6,9 |
| 12 | 0 | Any | 0,2,4,6,8 |
| 13 | 0 | Any | 1,3,5,7,9 |
| 14 | 0 | Any | 0,1,2,3,4,5,6,7,8,9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1,6 |
| 23 | 1 | Any | 2,7 |
| 24 | 1 | Any | 3,8 |
| 25 | 1 | Any | 1,4,7 |
| 26 | 1 | Any | 2,5,8 |
| 27 | 1 | Any | 3,6,9 |
| 28 | 1 | Any | 0,2,4,6,8 |
| 29 | 1 | Any | 1,3,5,7,9 |
| 30 | N/A | N/A | N/A |
| 31 | 1 | Even | 9 |
| 32 | 2 | Even | 1 |
| 33 | 2 | Even | 4 |

TABLE 4-continued

| PRACH Configuration Index | Preamble Format | SFN | Subframe number |
|---|---|---|---|
| 34 | 2 | Even | 7 |
| 35 | 2 | Any | 1 |
| 36 | 2 | Any | 4 |
| 37 | 2 | Any | 7 |
| 38 | 2 | Any | 1,6 |
| 39 | 2 | Any | 2,7 |
| 40 | 2 | Any | 3,8 |
| 41 | 2 | Any | 1,4,7 |
| 42 | 2 | Any | 2,5,8 |
| 43 | 2 | Any | 3,6,9 |
| 44 | 2 | Any | 0,2,4,6,8 |
| 45 | 2 | Any | 1,3,5,7,9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1,6 |
| 55 | 3 | Any | 2,7 |
| 56 | 3 | Any | 3,8 |
| 57 | 3 | Any | 1,4,7 |
| 58 | 3 | Any | 2,5,8 |
| 59 | 3 | Any | 3,6,9 |
| 60 | N/A | N/A | N/A |
| 61 | N/A | N/A | N/A |
| 62 | N/A | N/A | N/A |
| 63 | 3 | Even | 9 |

In Table 4, SFN denotes a system frame number.

The first PRB, $n^{RA}_{PRB}$, allocated to the PRACH opportunity considered for preamble formats 0, 1, 2 and 3 is defined by $n^{RA}_{PRB}=n^{RA}_{PRBoffset}$, where the PRACH frequency offset $n^{RA}_{PRBoffset}$ is a PRB configured by higher layers and satisfies $0 \leq n^{RA}_{PRBoffset} \leq N^{UL}_{RB}-6$.

In case of frame structure type 2 with preamble formats 0 to 4, a plurality of random access resources may exist within UL subframe (or UpPTS for preamble format 4) in accordance with UL/DL configuration. The random access resources for the frame structure type 2 are defined in accordance with PRACH configuration index (see 3GPP TS 36.211 standard document).

Figure 4:
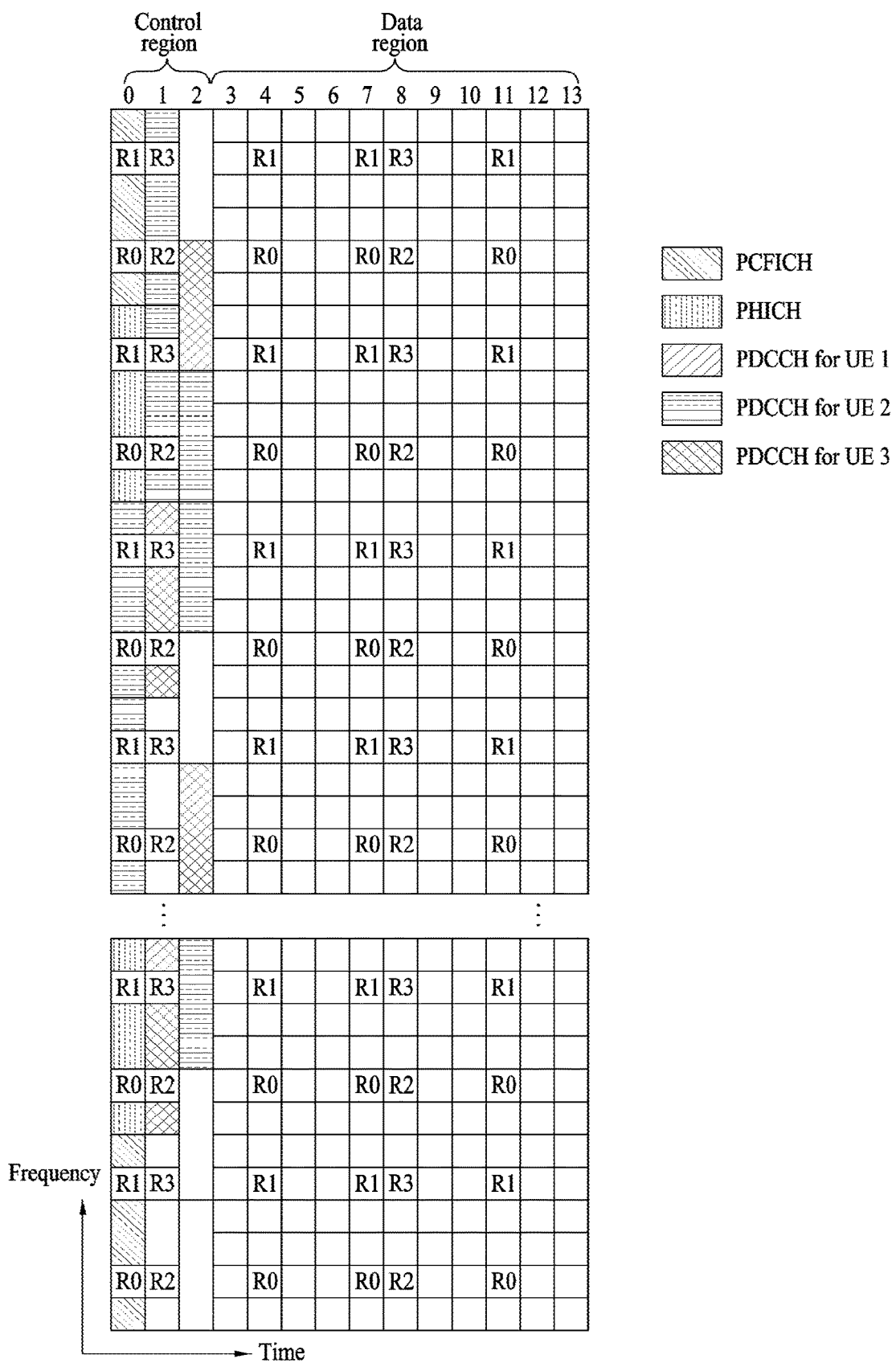
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 5

| Subframe | Number of OFDM symbols for PDCCH when $N^{DL}_{RB} > 10$ | Number of OFDM symbols for PDCCH when $N^{DL}_{RB} > 10$ |
|---|---|---|
| Subframe 1 and 6 for frame structure type 2 MBSFN subframes on a carrier supporting PDSCH, configured with 1 or 2 cell-specific antenna ports | 1, 2 | 2 |
| | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 5. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 6

| CFI | CFI code word <$b_0, b_1, ..., b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 7

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |

TABLE 7-continued

| DCI format | Description |
|---|---|
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 7 may be defined. A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time. Table 8 illustrates transmission modes for configuring multi-antenna technology and DCI formats for allowing a UE to perform blind decoding at the corresponding transmission mode. Particularly, Table 8 illustrates a relation between PDCCH and PDSCH configured by C-RNTI (Cell RNTI (Radio Network Temporary Identifier)).

TABLE 8

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in Table 8, other transmission modes in addition to the transmission modes defined in Table 8 may be defined.

Referring to Table 8, a UE configured to a transmission mode 9, for example, tries to decode PDCCH candidates of a common search space (CSS) and a UE-specific search space (USS) to a DCI format 1A, and tries to decode PDCCH candidates of the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as a search space (SS). SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SS.

TABLE 9

| Type | Search space $S^{(L)}_k$ Aggregation level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 5:
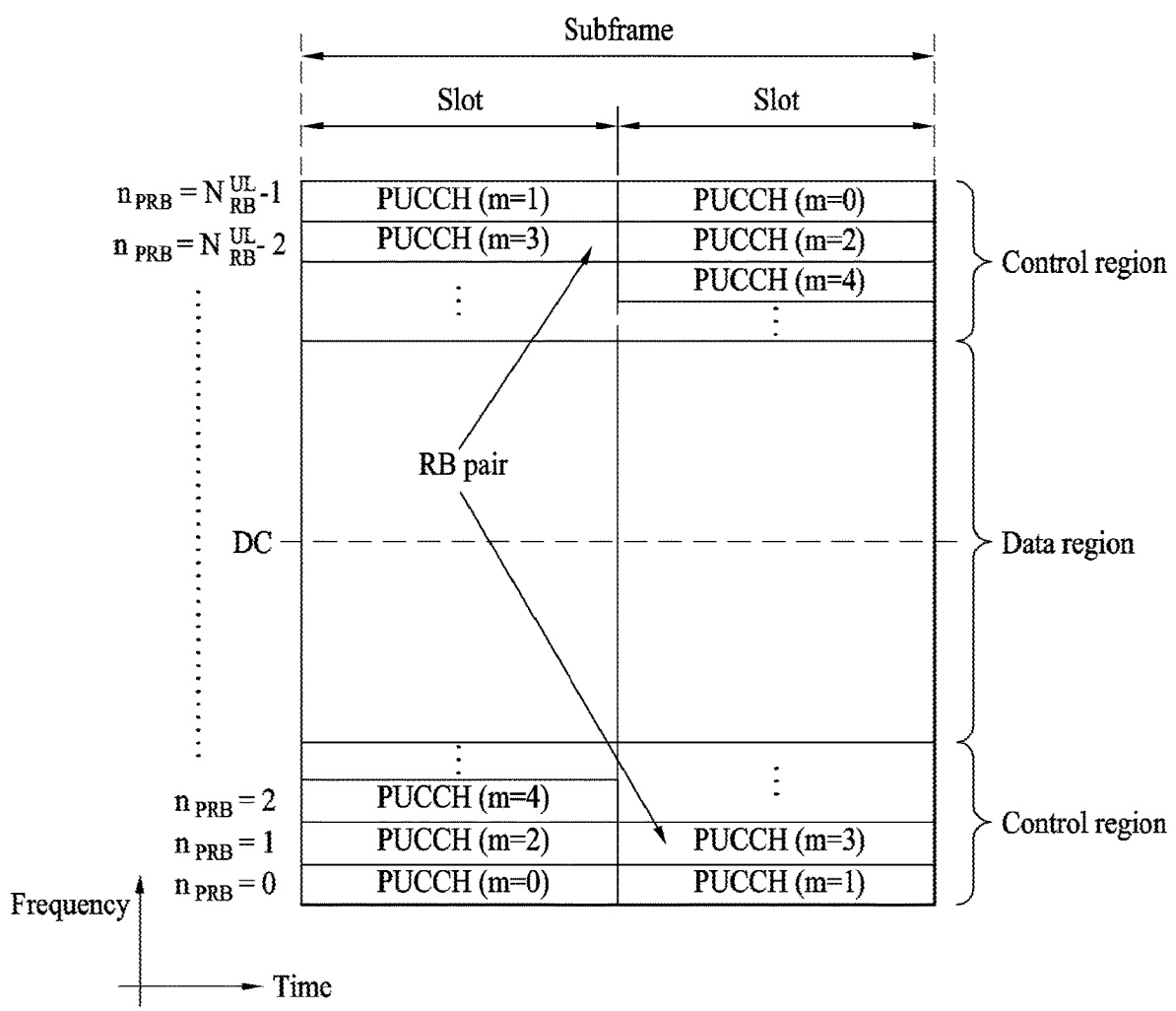
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency to in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

HARQ is a method used for error control. HARQ-ACK transmitted in DL is used for error control regarding UL data and HARQ-ACK transmitted in UL is used for error control regarding DL data. In DL, an eNB schedules one or more RBs for a UE selected according to a predetermined scheduling rule and transmits data to the UE using the scheduled RBs. Hereinafter, scheduling information for DL transmission will be referred to as a DL grant and a PDCCH carrying the DL grant will be referred to as a DL grant PDCCH. In UL, the eNB schedules one or more RBs for a UE selected according to a predetermined scheduling rule and the UE transmits data using allocated resources in UL. A transmitting device performing a HARQ operation waits for an ACK signal after transmitting data (e.g. transport blocks or codewords). A receiving device performing the HARQ operation transmits an ACK signal only when the data has been correctly received and transmits a NACK signal when there is an error in the received data. Upon receiving the ACK signal, the transmitting device transmits next (new) data but, upon receiving the NACK signal, the transmitting device retransmits data. In a HARQ scheme, error data is stored in a HARQ buffer and initial data is combined with retransmission data in order to raise reception success rate.

The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, an eNB and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HAQR scheme, since the retransmission timing and retransmission resource allocation are determined by the system, almost no overhead occurs but retransmission efficiency is very low if this scheme is used in an environment in which the channel state is considerably changed. In current communication system, the asynchronous HARQ scheme is used in DL and the synchronous HARQ scheme is used in UL.

Several subpackets used for initial transmission and retransmission by the HARQ scheme are generated from one codeword packet. In this case, the generated several subpackets may be distinguished from each other by the length of the subpackets and the start location of the subpackets. Such a distinguishable subpacket is referred to as a redundancy version (RV) and RV information represents a scheduled start location of each RV.

A transmitting device transmits a subpacket over a data channel with respect to every HARQ transmission. In this case, a receiving device generates an RV of the subpacket for every HARQ transmission in a predetermined order between a transmission end and a reception end or randomly generates the RV and transmits RV information over a control channel. The receiving device maps the subpacket received over the data channel to an accurate location of a codeword packet in the predetermined RV order or using the RV information received over the control channel.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB.

Figure 6:
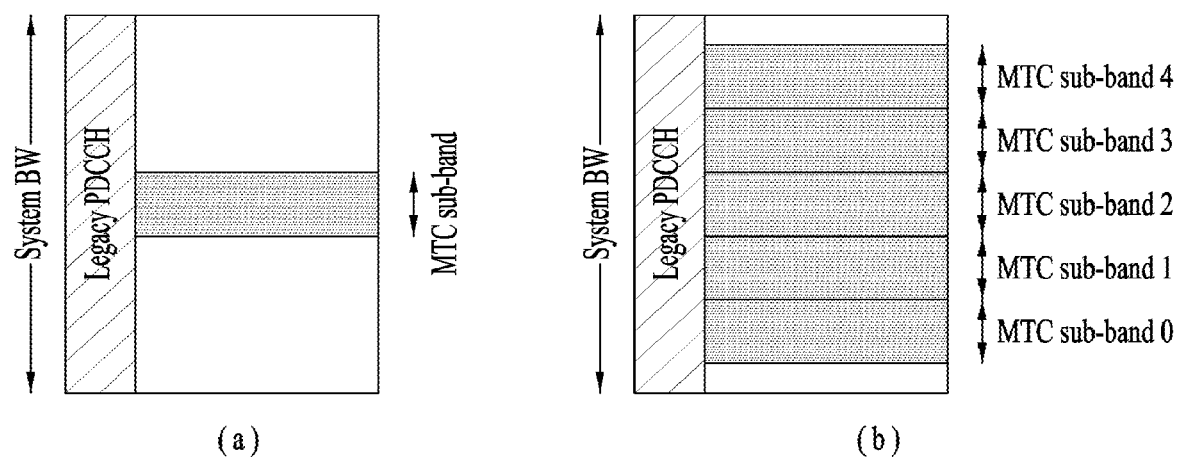
FIG. 6 illustrates an exemplary signal band for MTC.

FIG. 6 illustrates an exemplary signal band for MTC.

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 6(a), or multiple sub-bands for MTC may be provided in one subframe to multiplex MTC UEs in the subframe such that the UEs use different sub-bands or use the same sub-band which is not a sub-band consisting of the 6 center PRBs as shown in FIG. 6(b).

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy EPDCCH, may be introduced for the MTC UE. In the present invention described hereinbelow, the legacy EPDCCH or the M-PDCCH for a low-complexity or normal-complexity MTC UE will be referred to as an M-PDCCH. Hereinafter, an MTC-EPDCCH has the same meaning as the M-PDCCH.

A data channel (e.g., a PDSCH or a PUSCH) and/or a control channel (e.g., an M-PDCCH, a PUCCH, or a PHICH) may be transmitted repeatedly through multiple subframes or may be transmitted using a TTI bundling scheme, for coverage enhancement (CE) of a UE. Additionally, for CE, the control/data channel may be transmitted using a scheme such as cross-subframe channel estimation or frequency (narrowband) hopping. Herein, cross-subframe channel estimation refers to a channel estimation method using not only an RS in a subframe in which a corresponding channel is present but also an RS in neighboring subframe(s).

An MTC UE may require CE up to, for example, 15 dB. However, all MTC UEs are not always under an environment requiring CE, nor are requirements for quality of service (QoS) of all MTC UEs the same. For example, devices such as a sensor and a meter have limited mobility and a small amount of data transmission and reception and have a high possibility of being located in a shadow area, thereby requiring high CE. However, wearable devices such as a smartwatch etc. may have greater mobility and a relatively large amount of data transmission and reception and have a high possibility of being located in a non-shadow area. Therefore, all MTC UEs do not necessarily require CE of a high level and demanded capabilities of CE may differ according to types of MTC UEs.

In embodiments of the present invention, which will be described below, "assumes" may mean that an entity transmitting a channel transmits the channel in accordance with the corresponding "assumption" or that an entity receiving the channel receives or decodes the channel in the form conforming to the "assumption" on the premise that the channel has been transmitted according to the "assumption". For example, "a specific DCI format is assumed for a specific CE mode" may mean that an eNB, which desires to transmit DCI to a UE of the specific CE mode, transmits the DCI to the UE by configuring or generating the DCI based on a specific DCI format or according to the specific DCI format. The UE expects that the DCI therefor will be received in a DCI format corresponding to a CE mode thereof and may decode or receive an M-PDCCH (i.e., DCI) based on the specific DCI format or according to the specific DCI format. The UE may not attempt to decode or receive the M-PDCCH as a DCI mode which does not correspond to the CE mode thereof.

The present invention classifies types of MTC UEs and proposes capabilities demanded according to each type and transmission schemes.

A. MTC UE Type

An MTC UE may be configured by the entirety or some of the following types.

TYPE 1: MTC UEs Supporting NC+Small CE

UE types configuring MTC UEs may include a UE type supporting only normal coverage (NC) and small CE (hereinafter, TYPE 1). NC refers to a transmission scheme/environment in which transmission schemes for CE, for example, repetition/TTI bundling, frequency hopping (within repetition), and cross-subframe channel estimation, are not performed because CE is not required. Small CE may refer to a transmission environment requiring only CE of about 5 dB or a transmission scheme satisfying CE of about 5 dB, among CE of a maximum of 15 dB (based on DL).

This type of MTC UE may include UEs which do not require additional CE compared with legacy devices because the UEs are not located in a shadow area. However, the MTC UEs are characterized in that the number of reception (Rx)/radio frequency (RF) antenna chains is decreased for cost reduction and a maximum UL power is reduced. For these reasons, the MTC UEs are subjected to some coverage loss compared with legacy UEs. To compensate for such coverage loss, small CE of, for example, 5 dB or so, may be required.

TYPE 2: MTC UEs Supporting NC+Small/Medium/High CE

The UE types configuring MTC UEs may include a UE type supporting from NC to high CE, i.e., all of NC, small CE, a medium CE, and high CE, (hereinafter, TYPE 2). Medium CE may refer to a transmission environment requiring CE of about 10 dB or a transmission scheme satisfying CE of about 10 dB, among CE of a maximum of 15 dB (based on DL). High CE may refer to a transmission environment requiring CE of about 15 dB or a transmission scheme satisfying CE of about 15 dB, among CE of a maximum of 15 dB (based on DL).

This type of MTC UE may include UEs which may require additional CE of a maximum of 15 dB compared with legacy devices because the UEs may be located in a shadow area. However, a required CE level may vary with a situation because the CE level may differ according to a location at which a UE is placed, a channel environment, or the like. Accordingly, this type of MTC UE supports various CE levels from NC to high CE of about 15 dB.

TYPE 3: MTC UEs Supporting Medium/High CE

Another UE type configuring MTC UEs is a UE type supporting medium CE and high CE. That is, UEs of TYPE 3 may support only medium/high CE having a relatively high CE level, without supporting NC and small CE.

This type of MTC UE may include UEs which require additional CE of a maximum of 15 dB compared with legacy devices because the UEs are mainly located in a shadow area. Although this type of MTC UE may be present in an environment which does not require a high CE level, this type of MTC UE may always support only a transmission environment/transmission scheme of medium/high CE in order to further achieve reduction in complexity/cost by eliminating functions needed in a transmission scheme of NC and small CE environments.

TYPE 4: MTC UEs Supporting Small/Medium/High CE

Another UE type configuring MTC UEs is a UE type supporting small/medium/high CE but not supporting NC (without repetition).

This type of MTC UE may include UEs which require additional CE of a maximum of 15 dB compared with legacy devices because the UEs may be located in a shadow area. However, a required CE level may vary with a situation because the CE level may differ according to a location at which a UE is placed, a channel environment, or the like. Accordingly, this type of MTC UE supports various CE levels from small CE of about 5 dB to high CE of about 15 dB. Although this type of MTC UE may be present in an NC environment, this type of MTC UE may support only a transmission environment/transmission scheme of small/medium/high CE in order to further achieve reduction in complexity/cost by eliminating functions needed in a transmission scheme of the NC environment.

TYPE 4 is applicable to a low-complexity UE of LTE Rel-13 supporting reduced bandwidth. TYPE 4 is also applicable to a UE which supports enhanced coverage and does not support reduced bandwidth. A UE of TYPE 4 may support only TYPE 3 or may support TYPE 4. If a UE supporting only TYPE 3 requires small coverage, the UE may be assumed to use functionality supported by a legacy system, such as TTI bundling.

B. Required Capabilities According to MTC UE Type

A transmission/reception scheme which should be supported may differ according to MTC UE types as mentioned in Section A. The present invention proposes a transmission/reception scheme required according to an MTC UE type.

M-PDCCH Aggregation Levels

An M-PDCCH, which is a physical DL control channel for an MTC UE, may use multiple aggregation levels (ALs) in NC and small CE environments, for scheduling flexibility, link adaptation, and the like. Accordingly, the UE may need to blind-detect an M-PDCCH candidate through which DCI is transmitted thereto with respect to the multiple ALs.

However, in a medium/high CE environment, the M-PDCCH may always be transmitted using a maximum AL (e.g., AL=24) in order to minimize the number of repetitions necessary to transmit the M-PDCCH by maximizing the amount of resources used to transmit the M-PDCCH in one subframe. Accordingly, in the medium/high CE environment, the UE may assume that the M-PDCCH is always transmitted using a specific AL. For example, the UE may assume that the M-PDCCH is transmitted by aggregating CCEs, ECCEs, or M-CCEs (hereinafter, collectively referred to as M-CCEs) of a number corresponding to the specific AL and may perform decoding with respect to each set of the M-CCEs corresponding to the specific AL. For reference, the number of repetitions necessary to transmit the M-PDCCH may correspond to, for example, the number of subframes of an M-PDCCH bundle (i.e., the size of subframes of an M-PDCCH bundle). Herein, the M-PDCCH bundle refers to a set of M-PDCCHs which are repeatedly transmitted many times, a set of subframes in which the M-PDCCHs are transmitted, or a subframe duration in which repetitive transmission of the M-PDCCHs is performed.

Accordingly, MTC UEs of TYPE 1, TYPE 2, and TYPE 4 which need to perform a transmission/reception scheme for NC and/or small CE should support M-PDCCH reception for multiple ALs and blind detection of candidates for multiple ALs. On the other hand, MTC UEs of Type 3 performing only a transmission/reception scheme for medium/high CE may support only M-PDCCH reception for a specific AL (e.g., AL=24).

Alternatively, resource configuration or mapping of the M-PDCCH may differ according to CE environment. For example, in medium/high CE, one M-PDCCH may be mapped to a semi-static or prefixed restricted resource. In NC/small CE, since multiple M-PDCCHs may be mapped to the resource, this means that a UE should detect an M-PDCCH thereof through a certain operation. Accordingly, in a medium/high CE environment, it may be assumed that the UE operates even though the UE does not receive any configuration. In an NC/small CE environment, it is assumed that the UE basically performs an operation caused by basic configuration even though default configuration is present. In other words, the UE of medium/high CE may operate even when additional configuration provided thereto is not present but the UE of NC/small CE may operate only when configuration is provided thereto. The UE of NC/small CE may be notified of default configuration as additional configuration.

Accordingly, the MTC UEs of TYPE 1, TYPE 2, and TYPE 4 which need to perform a transmission/reception scheme for NC and/or small CE should support an operation of detecting M-PDCCHs thereof through any operation (e.g., blind decoding) because multiple M-PDCCHs are mapped to a semi-static or prefixed restricted resource. Meanwhile, the MTC UE of TYPE 3 supporting only medium/high CE may detect an M-PDCCH under the assumption that only one M-PDCCH is always mapped to the semi-static or prefixed restricted resource semi-statically.

Cross-Subframe Scheduling

When CE is performed, an M-PDCCH subframe bundle may be transmitted first using cross-subframe scheduling and then a scheduled PDSCH may be transmitted after transmission of the M-PDCCH subframe bundle is ended. In other words, when an M-PDCCH is received finally in subframe n, a corresponding PDSCH may be received in subframe n+k (where k is a positive integer). Herein, k may be prefixed value or may be a value which is set through the M-PDCCH or a higher layer signal.

However, in a normal/small coverage environment, same-subframe scheduling (e.g., self-subframe scheduling) in which the M-PDCCH and the scheduled PDSCH are transmitted in the same subframe or cross-subframe scheduling in which the scheduled PDSCH is transmitted after the next subframe of the subframe in which the M-PDCCH is transmitted may be applied.

All MTC UEs of TYPEs 1, 2, 3, and 4 mentioned in Section A should be capable of performing CE although CE levels are not identically demanded. Accordingly, all of the MTC UEs of TYPEs 1, 2, 3, and 4 should support a PDSCH reception scheme through cross-subframe scheduling.

Accordingly, if same-subframe scheduling or same-subframe transmission of the M-PDCCH and the PDSCH is applied only to an NC or small CE environment, this may mean that same-subframe scheduling or same-subframe reception of the M-PDCCH/PDSCH need not be supported with respect to the UE of TYPE 3.

Cross-Narrowband Scheduling

Figure 7:
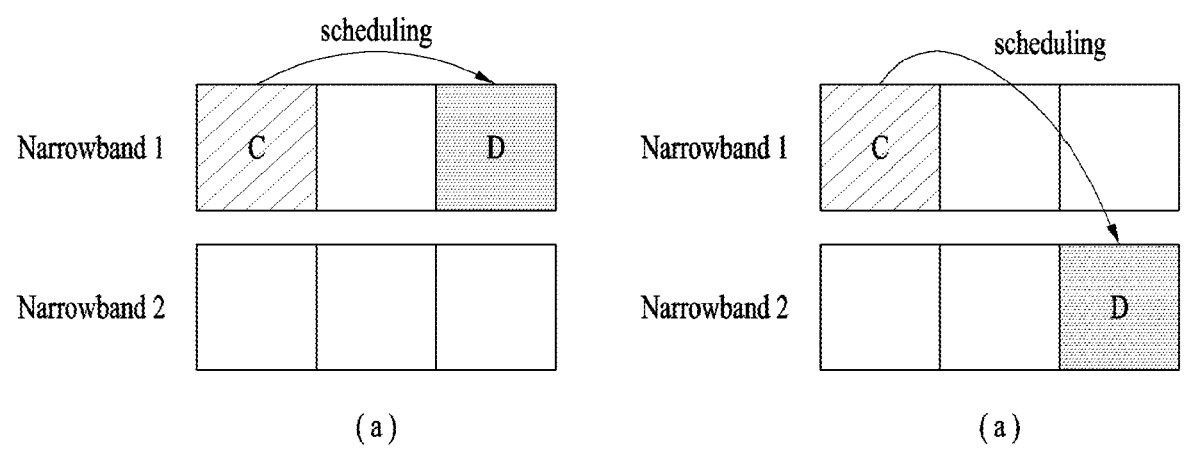
FIG. 7 illustrates narrowband scheduling according to an embodiment of the present invention.

FIG. 7 illustrates narrowband scheduling according to an embodiment of the present invention.

An MTC UE may perform transmission/reception only through a narrowband having bandwidth (e.g., 1.4 MHz) narrower than system bandwidth. In this case, a frequency location of the narrowband in which the UE operates within system bandwidth may be changed. If a channel environment differs according to each narrowband, cross-narrowband scheduling in which a scheduled PDSCH is transmitted at a narrowband location different from a narrowband location at which an M-PDCCH is transmitted as illustrated in FIG. 7(b) may be used, in order to transmit data in a narrowband having a better channel environment. On the other hand, same-narrowband scheduling in which the scheduled PDSCH is always transmitted at the same narrowband location as a narrowband location at which the M-PDCCH is transmitted as illustrated in FIG. 7(a) may be applied. This may mean that the UE should perform CSI feedback for one or more narrowbands in order to discover a good narrowband. This may also mean that the UE should have capabilities of processing a gap duration for frequency retuning for cross-narrowband scheduling. Accordingly, when cross-narrowband scheduling is supported, this may indicate that other capabilities more than basic capabilities for CSI feedback and frequency retuning are demanded. For example, in addition to CSI feedback for one narrowband and frequency retuning delay of 1 ms or so, the UE may be requested to perform CSI feedback for one or more narrowbands and frequency retuning delay of one symbol or so.

In an NC environment or in a small CE environment in which the number of repetitions of a control/data channel is small, cross-narrowband scheduling may be applied in order to raise data transmission rate by selecting a narrowband favorable for a channel environment.

However, in a medium/high CE environment, since the number of repetitions of the data channel is large, a channel environment may be changed even during a transmission duration of the data channel. While the data channel is repeatedly transmitted, if frequency hopping from a current frequency resource to another frequency resource or narrowband hopping from a current narrowband to another narrowband is performed, a scheme in which a UE/eNB transmits data by selecting a frequency/narrowband having a good channel state according to a channel environment may be meaningless. If the number of repetitions is significantly large, a channel environment is changed over the time domain while repetition transmission is performed. Therefore, even though data transmission is performed by selecting a narrowband having a good channel state, the channel state of the corresponding narrowband may worsen while data transmission is performed. In addition, in a medium/high CE environment having a large number of repetitions, since a channel environment is changed over time, time diversity gain may be acquired and thus channel transmission performance may become similar even when a random narrowband is selected. In the case of frequency diversity gain, since frequency/narrowband hopping is performed, frequency diversity gain may be obtained although a frequency/narrowband having a good channel state is not selected. Accordingly, in the medium/high CE environment, same-narrowband scheduling may always be applied.

Accordingly, the MTC UEs of TYPE 1, TYPE 2, and TYPE 4 supporting NC and small CE may support transmission/reception of a PDSCH (and a PUSCH) through cross-narrowband scheduling. However, the MTC UE of TYPE 3 may support only same-narrowband scheduling and may not support cross-narrowband scheduling, because the UE always performs only an operation of medium/high CE. Although the MTC UE of TYPE 4 supports small CE, the MTC UE of TYPE 4 may support only same-narrowband scheduling and may not support cross-narrowband scheduling in consideration of complexity for supporting cross-narrowband scheduling.

Frequency Hopping

To reduce the number of repetitions when a control/data channel is repeatedly transmitted through multiple subframes in a CE environment, a frequency hopping (narrowband hopping) scheme in which a transmission narrowband of the control/data channel is hopped may be used while repeated transmission is performed. In a small CE environment in which the number of repetitions of the control/data channel is not large relative to a period of frequency hopping, it may be unnecessary to apply frequency hopping.

The MTC UE of TYPE 1 supporting only NC and small CE may support transmission and reception using frequency hopping with respect to an M-PDCCH, a PDSCH, and/or a PUSCH if frequency hopping for transmission and reception of the M-PDCCH, the PDSCH, and/or the PUSCH in small CE can be applied. However, if frequency hopping is always not applied in small CE, the MTC UE of TYPE 1 supporting only NC and small CE may not support transmission and reception of the M-PDCCH, the PDSCH, and/or the PUSCH through frequency hopping. Alternatively, the MTC UE of TYPE 1 may support transmission using frequency hopping with respect to UL transmission (e.g., PUSCH or PUCCH) but may not support reception using frequency hopping with respect to DL transmission (e.g., M-PDCCH or PDSCH).

The MTC UEs of TYPE 2, TYPE 3, and TYPE 4 supporting medium/high CE may support transmission and reception of the control/data channel through frequency hopping.

Notably, transmission of the PUCCH using frequency hopping may always be supported by the MTC UEs of all of TYPEs 1, 2, 3, and 4. Characteristically, an SIB etc. may be transmitted through frequency hopping. Although all UEs may be mandated to support frequency hopping, whether to perform transmission through frequency hopping may be determined on a per-UE basis or on a per-coverage basis.

PRB Allocation for PDSCH/PUSCH

For PDSCH/PUSCH transmission, in NC and small CE environments, PRB allocation may be flexibly performed for scheduling flexibility, link adaptation, and the like. Accordingly, PRB allocation information for PDSCH/PUSCH transmission may be dynamically configured for a UE through, for example, DCI.

However, in a medium/high CE environment, the PDSCH may always be transmitted using a maximum amount of PRB resources (e.g., 6 PRBs) in order to minimize the number of repetitions necessary for PDSCH transmission (e.g., the number of subframes of a PDSCH bundle) by maximizing the amount of resources used for PDSCH transmission in one subframe. The PUSCH may always be transmitted using a minimum amount of PRB resources (e.g., one PRB) in order to minimize the number of repetitions necessary for PUSCH transmission (e.g., the number of subframes of a PUSCH bundle) through power spectral density (PSD) boosting.

Accordingly, the MTC UEs of TYPE 1, TYPE 2, and TYPE 4 which need to perform a transmission and reception scheme for NC and small CE should support PDSCH/PUSCH transmission and reception through flexible PRB resources. On the other hand, the MTC UE of TYPE 3 which performs only a transmission and reception scheme for medium/high CE may support only PDSCH/PUSCH transmission and reception for a specific PRB size, i.e., a specific number of PRBs (e.g., 6 PRBs for the PDSCH and one PRB for the PUSCH). Although the MTC UE of TYPE 4 may support small CE but may support only PDSCH/PUSCH transmission and reception for a specific PRB size (e.g., 6 PRBs for the PDSCH and one PRB for the PUSCH) upon considering complexity for supporting flexible PRB resource allocation of the PDSCH/PUSCH.

C. Transmission Mode of MTC UE

According to a CE level of an MTC UE or configuration of an eNB, an operation of the UE for transmitting and receiving a control/data channel may differ. The present invention proposes a control/data channel transmission and reception scheme according to an operation mode of the UE.

The operation mode of the UE may be determined using the following methods.

Method 1. Implicit Configuration According to CE Level

The operation mode of the UE may be implicitly determined according to a CE level of the UE. The CE level of the UE may be semi-statically configured through an RRC signal from the eNB. If the CE level of the UE is changed, the operation mode of the UE may also be changed. Alternatively, the CE level of the UE may be determined by a CE level of a PRACH resource selected from a successful RACH procedure. According to method, change of the CE level of the UE may differ. For example, in the case of semi-static configuration, the CE level may be changed by network signaling. If the CE level is determined by an RACH, the CE level may be determined by RACH transmission of the UE. If the UE desires to change the CE level through the RACH, it is assumed that the CE level of the UE before the RACH procedure is successfully ended maintains a previous CE level. For example, the UE which desires to change the CE level may monitor and/or blind-decode an M-PDCCH according to a previous CE level until the RACH procedure is successfully ended. If the CE level is not configured for the UE, it may be assumed that the CE level of the UE is a maximum CE level (supported by a network).

Method 2. Explicit Configuration from eNB

The eNB may determine the operation mode of the UE through information about type/capability of the UE or the CE level of the UE and may semi-statically configure the operation mode of the UE through an RRC signal. Such an operation mode may mean a transmission mode (TM) of the UE. That is, the eNB may configure the TM of the UE for the UE using the information such as the type/capability of the UE or the CE level of the UE through the RRC signal.

A PRACH transmission resource may be connected to a CE mode. For example, PRACH resource sets 0 and 1 may be connected to CE Mode A and PRACH resource sets 2 and 3 may be connected to CE Mode B. The UE may select a PRACH resource set so that the CE mode may be implicitly configured for the UE and, after RRC connection or a setup procedure, the CE mode may be explicitly re-configured for the UE.

Alternatively, the CE mode may not be applied while the UE receives cell-common data or performs the PRACH procedure and may be determined only through an RRC connection/configuration procedure. When an RRC connection response is transmitted through Msg4 (i.e., a contention-based PRACH resolution message) in a state in which the RRC connection/configuration procedure is performed, if RRC parameters are not transmitted, this means that a CE mode associated with conventionally used default parameters or a PRACH resource set may be continuously used.

That is, it may be assumed that a parameter set associated with the PRACH resource set is a default parameter. It may be assumed that a default parameter set for each CE level is transmitted through an SIB.

Next, the present invention proposes determining the operation mode of the UE and applying the control/data channel transmission and reception scheme according to the operation mode. For example, the operation mode of the UE may be determined as in Method 1 and Method 2 and the control/data channel transmission and reception scheme according to the determined operation mode may be applied.

Alt 1

The operation mode of the MTC UE may include three modes, i.e., CE Mode A, CE Mode B, and CE Mode C.

If the operation mode of the UE is implicitly determined according to the CE level of the UE as in Method 1, the operation mode of the UE when the CE level of the UE is NC (i.e., no CE) may become CE Mode A and the operation mode of the UE when the CE level of the UE is small CE may become CE Mode B. When the CE level of the UE is medium/high CE, the operation mode of the UE may become CE Mode C. Herein, since the MTC UE of TYPE 1 mentioned in Section A supports only NC and small CE, CE Mode A or CE Mode B may be configured for the MTC UE of TYPE 1 according to the CE level of the UE. Since the MTC UE of TYPE 2 supports all CE levels, CE Mode A, CE Mode B, or CE Mode C may be configured for the MTC UE of TYPE 2 according to the CE level of the UE. Meanwhile, since the MTC UE of TYPE 3 supports only medium/high CE, only CE Mode C may always be configured for the MTC UE of TYPE 3. In addition, since the MTC UE of TYPE 4 supports small/medium/high CE, CE Mode B or CE Mode C may be configured for the MTC UE of TYPE 4.

The eNB may configure the operation mode of the UE as in Method 2. In this case, the operation mode configured for the UE may be relevant or irrelevant to the CE level of the eNB. However, CE Mode A, CE Mode B, and CE Mode C may be defined in consideration of an NC level, a small CE level, and a medium/high CE level, respectively.

For Alt 1, the control/data channel transmission and reception scheme which is applicable according to each operation mode may be as follows.

M-PDCCH ALs

In CE Mode A configured by targeting a CE level of normal coverage (no CE), an M-PDCCH, which is a physical DL control channel for an MTC UE, may use a plurality of ALs for scheduling flexibility, link adaptation, etc. Accordingly, the UE may need to blind-detect M-PDCCH candidates on which DCI is transmitted thereto with respect to the multiple ALs. In other words, the UE may attempt to decode the M-PDCCH candidates using each of the multiple ALs. In this case, the number of M-PDCCH candidates for each AL may be defined (in the standard document) or may be configured for the UE through an RRC signal by the eNB, with respect to an NC level (e.g., the number of repetitions (subframes) for M-PDCCH transmission=1) or with respect to the case in which CE Mode A is configured.

Even when CE Mode B is configured, the multiple ALs may be present for M-PDCCH transmission. The number of M-PDCCH candidates for each AL may be defined (in the standard document) or may be configured for the UE through the RRC signal by the eNB, with respect to a small CE level or with respect to the case in which CE Mode B is configured.

When CE Mode C considering a medium/high CE level is configured for the UE, the M-PDCCH may always be transmitted using a maximum AL (e.g., AL=24) in order to minimize the number of repetitions necessary to transmit the M-PDCCH (the size of subframes of an M-PDCCH bundle). Accordingly, when CE Mode C is configured, the MTC UE may assume that the M-PDCCH is always transmitted using a specific AL (e.g., AL=24).

Cross-Subframe Scheduling

In CE Mode A considering NC (no CE), both same-subframe scheduling and cross-subframe scheduling may be applied for PDSCH scheduling. In this case, which scheduling scheme among same-subframe scheduling and cross-subframe scheduling will be applied in order for the UE of CE Mode A to receive a PDSCH may be configured for the UE through the DCI or the RRC signal. Alternatively, the UE of CE Mode A may assume that cross-subframe scheduling is always applied to receive the PDSCH.

Meanwhile, since the M-PDCCH and the PDSCH are repeatedly transmitted for CE for the MTC UE to which CE Mode B and CE Mode C are applied, the UE may assume that cross-subframe scheduling is always applied.

Cross-Narrowband Scheduling

In CE Mode A considering NC (no CE) and CE Mode B considering a CE level of small CE, both same-subframe scheduling and cross-subframe scheduling may be applied for PDSCH and/or PUSCH scheduling. In this case, which scheduling scheme among same-narrowband scheduling and cross-narrowband scheduling will be applied in order for the UE of CE Mode A and/or CE Mode B (hereinafter, CE Mode A/B) to transmit and receive the PDSCH and/or the PUSCH may be configured through the DCI or the RRC signal. Alternatively, the UE of CE Mode A/B may assume that cross-narrowband scheduling is always applied to transmit and receive the PDSCH and/or the PUSCH. Alternatively, the UE of CE Mode A/B may assume that same-narrowband scheduling is always applied to transmit and receive the PDSCH and/or the PUSCH.

Meanwhile, in CE Mode C considering a medium/high CE level, same-narrowband scheduling may always be applied for PDSCH and/or PUSCH scheduling. As described earlier, if the number of repetitions increases, a channel state of a narrowband is changed according to a time flow while a signal is transmitted and thus it may be meaningless to select a good narrowband. Alternatively, when frequency hopping is applied to PDSCH (PUSCH) transmission, it may be assumed that same-narrowband scheduling is always applied and, when frequency hopping is not applied, it may be assumed that cross-narrowband scheduling is applied. Alternatively, which scheduling scheme among same-narrowband scheduling and cross-narrowband scheduling will be applied for PDSCH and/or PUSCH transmission and reception may be configured through the DCI or the RRC signal.

Frequency Hopping

In CE Mode A considering NC (no CE) and CE Mode B considering the CE level of small CE, an effect of frequency hopping may not be significant. Accordingly, in this case, whether to apply frequency hopping for M-PDCCH, PDSCH, PUSCH, PHICH, and/or PUCCH transmission and reception may be configured through the DCI or the RRC signal. Alternatively, the UE may assume that frequency hopping is always not applied for PDCCH, PDSCH, PUSCH, PHICH reception and/or PUCCH transmission in CE Mode A and CE Mode B.

On the other hand, in CE Mode C considering the CE level of medium/high CE, frequency hopping may always be applied for M-PDCCH, PDSCH, PUSCH, PHICH, and/or PUCCH transmission and reception. Accordingly, the UE may assume that frequency hopping is always applied for M-PDCCH, PDSCH, PUSCH, PHICH, and/or PUCCH transmission and reception in CE Mode C. Alternatively, whether to apply frequency hopping for M-PDCCH, PDSCH, PUSCH, PHICH, and/or PUCCH transmission and reception may be configured through the DCI or the RRC signal.

PRB Allocation for PDSCH/PUSCH

In CE Mode A considering NC (no CE) and CE Mode B considering the CE level of small CE, PRB resource allocation may be flexibly performed for scheduling flexibility, link adaptation, and the like. Accordingly, PRB allocation information for PDSCH/PUSCH transmission may be dynamically configured for the UE through the DCI.

Meanwhile, in CE Mode C considering the CE level of medium/high CE, a PDSCH may be defined to always be transmitted using a maximum amount of PRB resources (e.g., 6 PRBs). Accordingly, the UE may assume that the PDSCH is always transmitted through 6 PRBs or the entire PRB size region of a narrowband in which the PDSCH is transmitted. In the case of a PUSCH, it may be assumed that the PUSCH is transmitted using a minimum amount of PRB resources (e.g., one PRB) in order to minimize the number of repetitions necessary to transmit the PUSCH (the size of subframes of a PUSCH bundle) through PSD boosting.

DCI Format

A DCI format which will be used by the UE to receive an M-PDCCH which schedules a PDSCH may be determined with respect to each operation mode of the UE. For example, if CE Mode A, CE Mode B, or CE Mode C is configured for the UE, it may be assumed that DCI for scheduling the PDSCH is transmitted using DCI format a, DCI format b, and DCI format c, respectively.

Alternatively, DCI format candidates which may be used by the UE to receive the M-PDCCH which schedules the PDSCH may be determined with respect to each operation mode (i.e., each CE mode). Among a plurality of DCI format candidates, a DCI format which will be used by the UE to receive the M-PDCCH which schedules the PDSCH may be configured for the UE (from the eNB) through the RRC signal.

PDSCH Transmission Scheme

To receive the PDSCH, the UE should be aware of a PDSCH transmission scheme, a transmission antenna port, an RS for channel estimation, and the like.

Such information may be determined according to in which DCI format DCI for scheduling the PDSCH is transmitted. In this case, if the UE is aware of a DCI format used for the DCI for scheduling the PDSCH, the UE may determine the PDSCH transmission scheme, the transmission antenna port, and the RS for channel estimation.

Meanwhile, the DCI format may not indicate the transmission scheme, the transmission antenna port, and the RS. In this case, even when the DCI format is determined, information about the PDSCH transmission scheme, the transmission antenna port, and the RS for channel estimation may be additionally configured for the UE through the RRC signal. Alternatively, in order to cause the UE to receive the PDSCH, the information about the PDSCH transmission scheme, the transmission antenna port, and the RS for channel estimation may be configured for the UE through the DCI for scheduling the PDSCH.

Alt 2

The operation mode of the MTC UE may include two modes, i.e., CE Mode A and CE Mode B.

If the operation mode of the UE is implicitly determined according to the CE level of the UE as in Method 1, the operation mode of the UE when the CE level of the UE is NC or small CE may become CE Mode A and the operation mode of the UE when the CE level of the UE is medium/high CE may become CE Mode B. Herein, since the MTC UE of TYPE 1 mentioned in Section A supports only NC and small CE, only CE Mode A may be configured for the MTC UE of TYPE 1. Since the MTC UE of TYPE 2 supports all CE levels, CE Mode A or CE Mode B may be configured for the MTC UE of TYPE 2 according to the CE level of the UE. Meanwhile, since the MTC UE of TYPE 3 supports only medium/high CE, only CE Mode B may always be configured for the MTC UE of TYPE 3. In addition, since the MTC UE of TYPE 4 supports medium/high CE, CE Mode A or CE Mode B may be configured for the MTC UE of TYPE 4. Alternatively, in the case of the UE of TYPE 4, it may be assumed that CE Mode B is always configured for the MTC UE of TYPE 4 regardless of a CE level in order to reduce complexity for performing an operation in CE Mode A.

An MTC UE, which supports only CE without applying bandwidth reduction for reducing a transmission and reception bandwidth to 6 PRBs, may support CE Mode A even when the number of repetitions is 1, if CE Mode A is configured. In this case, a UE which desires to form cell association with a normal network may perform cell setup again. This may correspond to same-cell handover. That is, a UE which may be attached to the normal network may operate in CE Mode A with respect to the case in which the number of repetitions is 1 or operate under the assumption that the UE is configured as a normal case, according to a cell with which the UE is associated.

The eNB may configure operation mode of the UE as in Method 2. In this case, the operation mode configured for the UE may be associated with the CE level of the eNB or may not be associated with the CE level of the eNB. However, CE Mode A may be defined in consideration of an NC/small CE level and CE Mode B may be defined in consideration of a medium/high CE level.

In Alt 2, the control/data channel transmission and reception scheme which is applicable to each operation mode may be as follows.

M-PDCCH ALs

In CE Mode A which is configured by targeting the CE level of NC/small CE, an M-PDCCH, which is a physical DL control channel for an MTC UE, may use a plurality of ALs for scheduling flexibility, link adaptation, and the like. Accordingly, the UE may need to blind-detect M-PDCCH candidates on which DCI is transmitted thereto with respect to the multiple ALs. In this case, the number of M-PDCCH candidates for each AL may be defined (in the standard document) or may be configured for the UE through an RRC signal by the eNB, with respect to an NC level (e.g., the number of repetitions (subframes) for M-PDCCH transmission=1) or with respect to the case in which CE Mode A is configured.

When CE Mode B considering the CE level of medium/high CE is configured for the UE, the M-PDCCH may always be transmitted using a maximum AL (e.g., AL=24) in order to minimize the number of repetitions necessary to transmit the M-PDCCH (the size of subframes of an M-PDCCH bundle). Accordingly, when CE Mode B is configured, the MTC UE may assume that the M-PDCCH is always transmitted using a specific AL (e.g., AL=24).

Cross-Subframe Scheduling

In NC (no CE), both same-subframe scheduling and cross-subframe scheduling may be applied for PDSCH scheduling. However, when CE is needed, only cross-subframe scheduling may be applied for PDSCH scheduling.

In this case, the UE of CE Mode A may assume that cross-subframe scheduling is always applied for PDSCH reception. Alternatively, which scheduling scheme among same-subframe scheduling and cross-subframe scheduling will be applied in order for the UE of CE Mode A to receive a PDSCH may be configured through the DCI or the RRC signal. Alternatively, the UE may assume that same-subframe scheduling is applied when a CE level is NC and cross-subframe scheduling is applied when the CE level is small CE, according to the CE level of the UE.

Meanwhile, for the MTC UE to which CE Mode B is applied, the UE may assume that cross-subframe scheduling is always applied.

Cross-Narrowband Scheduling

In CE Mode A which is configured by targeting the CE level of NC/small CE, both same-subframe scheduling and cross-subframe scheduling may be applied for PDSCH and/or PUSCH scheduling. In this case, which scheduling scheme among same-narrowband scheduling and cross-narrowband scheduling will be applied in order for the UE of CE Mode A to transmit and receive the PDSCH and/or the PUSCH may be configured through the DCI or the RRC signal. Alternatively, the UE of CE Mode A may assume that cross-narrowband scheduling is always applied to transmit and receive the PDSCH and/or the PUSCH. Alternatively, the UE of CE Mode A may assume that same-narrowband scheduling is always applied to transmit and receive the PDSCH and/or the PUSCH.

Meanwhile, in CE Mode B considering the CE level of medium/high CE, same-narrowband scheduling may always be applied for PDSCH and/or PUSCH scheduling. Alternatively, when frequency hopping is applied to PDSCH (PUSCH) transmission, it may be assumed that same-narrowband scheduling is always applied and, when frequency hopping is not applied PDSCH (PUSCH) transmission, it may be assumed that cross-narrowband scheduling is applied. Alternatively, which scheduling scheme among same-narrowband scheduling and cross-narrowband scheduling will be applied for PDSCH and/or PUSCH transmission and reception may be configured for the UE through the DCI or the RRC signal.

Frequency Hopping

In CE Mode A considering NC (no CE) and the CE level of small CE, an effect of frequency hopping may not be significant. Accordingly, in this case, whether to apply frequency hopping for M-PDCCH, PDSCH, PUSCH, PHICH, and/or PUCCH transmission and reception may be configured through the DCI or the RRC signal. Alternatively, the UE may assume that frequency hopping is always not applied in CE Mode A for PDCCH, PDSCH, PUSCH, PHICH, and/or PUCCH transmission and reception.

On the other hand, in CE Mode B considering the CE level of medium/high CE, frequency hopping may always be applied for M-PDCCH, PDSCH, PUSCH, PHICH, and/or PUCCH transmission and reception. Accordingly, the UE may assume that frequency hopping is always applied in CE Mode B for M-PDCCH, PDSCH, PUSCH, PHICH, and/or PUCCH transmission and reception. Alternatively, whether to apply frequency hopping for M-PDCCH, PDSCH, PUSCH, PHICH, and/or PUCCH transmission and reception may be configured for the UE through the DCI or the RRC signal.

PRB Allocation for PDSCH/PUSCH

In CE Mode A considering NC (no CE) and the CE level of small CE, PRB resource allocation may be flexibly performed for scheduling flexibility, link adaptation, and the like. Accordingly, PRB allocation information for PDSCH/PUSCH transmission may be dynamically configured for the UE through DCI.

Meanwhile, in CE Mode B considering the CE level of medium/high CE, a PDSCH may be always transmitted using a maximum amount of PRB resources (e.g., 6 PRBs). Accordingly, the UE may assume that the PDSCH is always transmitted through 6 PRBs or the entire PRB size region of a narrowband in which the PDSCH is transmitted. In the case of a PUSCH, it may be assumed that the PUSCH is transmitted using a minimum amount of PRB resources (e.g., one PRB) in order to minimize the number of repetitions necessary to transmit the PUSCH (the size of subframes of a PUSCH bundle) through PSD boosting.

DCI Format

A DCI format which will be used by the UE to receive an M-PDCCH which schedules a PDSCH may be determined with respect to each operation mode of the UE. For example, if CE Mode A or CE Mode B is configured for the UE, it may be assumed that DCI for scheduling the PDSCH is transmitted using DCI format a and DCI format b, respectively.

Alternatively, DCI format candidates which may be used by the UE to receive the M-PDCCH which schedules the PDSCH may be determined with respect to each operation mode. Among a plurality of DCI format candidates, a DCI format which will be used by the UE to receive the M-PDCCH which schedules the PDSCH may be configured for the UE (from the eNB) through the RRC signal.

PDSCH Transmission Scheme

To receive the PDSCH, the UE should be aware of a PDSCH transmission scheme, a transmission antenna port, an RS for channel estimation, and the like.

Such information may be determined according to in which DCI format DCI for scheduling the PDSCH is transmitted. That is, if the UE is aware of a DCI format used by the DCI for scheduling the PDSCH, the UE may determine the PDSCH transmission scheme, the transmission antenna port, and the RS for channel estimation.

Meanwhile, the DCI format may not indicate the transmission scheme, the transmission antenna port, and the RS. In this case, even when the DCI format is determined, information about the PDSCH transmission scheme, the transmission antenna port, and the RS for channel estimation may be additionally configured for the UE through the RRC signal. Alternatively, in order for the UE to receive the PDSCH, the information about the PDSCH transmission scheme, the transmission antenna port, and the RS for channel estimation may be configured for the UE through the DCI for scheduling the PDSCH.

In addition, whether or not CSI feedback of the UE is performed (e.g., whether or not periodic CSI reporting should be supported), whether or not radio resource management (RRM) measurement is performed, and options of functions necessary for handover may be determined according to CE mode. Generally, if the CE mode is configured for the UE, there are basically assumed operations, i.e., default configurations. The UE may be separately reconfigured with respect to each function without changing the CE mode. If the UE receives reconfiguration, the UE may assume that the reconfiguration overrides configuration connected to the CE mode or the reconfiguration is misconfiguration. Such configuration may be differently applied according to each function. For example, the UE may assume that the DCI format and the transmission scheme can be reconfigured through RRC signaling but CSI feedback is misconfiguration.

In selecting the CE mode, a threshold value of a reference signal receive power (RSRP) may be transmitted through an SIB. In this case, the UE may select the CE mode according to the threshold value of the RSRP and report the CE mode to a network. The threshold value may be associated with a PRACH resource set and a PRACH resource may be selected with respect to each threshold value. For example, if an RSRP value measured by the UE is higher than a threshold value for CE Mode A, the UE starts to transmit a PRACH always from a PRACH resource of a lowest CE level. If the RSRP corresponds to a threshold value for CE Mode B, PRACH transmission may be defined to be started from PRACH resource set 3. As another example, the UE may start to transmit the PRACH always from the PRACH resource of the lowest CE level only when a successful PRACH CE level of the UE is not present or the UE is in an RRC_IDLE mode. If the RSRP value is the threshold value for CE Mode B, PRACH transmission may be defined to be started from PRACH resource set 3. As another example, when the RSRP corresponds to the threshold value for CE Mode A, the UE may start to transmit the PRACH from the PRACH resource of the lowest level and, when the RSRP corresponds to the threshold value for CE Mode B, the UE may start to transmit the PRACH from PRACH resource set 3. That is, the UE may select the CE mode (preferred thereby) by selecting a PRACH resource set.

If the size/length of the DCI format differs according to a UE operation mode or if the DCI format is fixed, this may mean that one TM is configured for each UE operation mode. In this case, if a TM is changed, this may mean that a UE operation mode is changed and operations designated in one UE operation mode are performed together. This means that such functions are limited to unicast data transmission and, in the case of broadcast data transmission (transmission using a P-RNTI, an SIB, an RA-RNTI, etc.), medium/high CE is always applied regardless of the UE operation mode (i.e., CE mode) and/or the TM. Alternatively, this may mean that, separately from the UE operation mode and/or the TM, one or more operation modes or TMs may be defined to transmit the broadcast data and which operation mode/TM is performed may be determined through cell-common signaling. For example, broadcast data transmission may always be scheduled using same-narrowband but unicast data transmission may be scheduled using same-narrowband or cross-narrowband. As another example, this may mean that the UE is capable of monitoring an M-PDCCH always for all CE levels for broadcast data transmission but a CE level of the M-PDCCH that the UE should monitor for unicast data transmission is limited.

If the broadcast data and the unicast data are transmitted by different schemes or different modes, the UE and the eNB may assume that there is no case in which the broadcast data and the unicast data are simultaneously scheduled in one subframe. Alternatively, the UE and the eNB may assume that the unicast data is not transmitted before repetition for one broadcast data is ended. This may mean that a (subframe) bundle of the broadcast data and a (subframe) bundle of the unicast data are not interlaced. The biggest reason why the bundle of the broadcast data and the bundle of the unicast data are not interlaced is that a collision phenomenon generated when transmission timings of the broadcast data and the unicast data are misaligned is prevented. Accordingly, if an operation/transmission mode of the broadcast data is signaled, the UE may assume that the network applies the same operation/transmission mode of the broadcast data to all CE levels. This may indicate that an operation/transmission mode of the unicast data may be changed by explicit network signaling.

For reference, a TM is applied only to data transmission and an antenna port and/or a transmission scheme become different according to the TM. In contrast, the CE mode affects reception of a DL control signal as well as reception of DL data, as the UE operation mode. The CE mode may also affect transmission of UL data or transmission of a UL control signal.

An operation/transmission mode for transmission/reception of broadcast data and/or broadcast control data may be determined according to a maximum CE level supported by the network. If an RSRP threshold value of a maximum CE level is higher than an RSRP of CE Mode A (if CE is lower than CE Mode A), it may be assumed that an operation of CE Mode A is always performed. In other words, when the RSRP threshold value of CE Mode A is present and when a maximum CE level supported by a cell and an RSRP associated with the corresponding CE level is present, if the RSRP threshold of the maximum CE level supported by a cell is less than the RSRP of CE Mode A, it may be assumed that an operation of CE Mode A is performed. For example, when the cell supports CE levels 1, 2, and 3 and an RSRP threshold value of CE level 3 is less than the RSRP threshold value of CE Mode A, the operation of CE Mode A may be performed. The RSRP threshold value of each CE level and the RSRP threshold value of the CE mode may be predefined or preset values. In the opposite case, it may be assumed that an operation of CE Mode B is always performed. In association with a random access response or an RACH procedure, it may be assumed that CE Mode A and CE Mode B are set according to a CE level or an associated PRACH resource set.

When the TM of the UE is configured by the eNB, the TM may be divided as follows according to an RS used by the UE to receive a PDSCH and/or transmit a PUSCH and/or the CE level of the UE.

Option 1

A PDSCH TM of the UE may include two modes, i.e., one for NC/small CE and the other for medium/high CE. The TM of the UE may be automatically determined according to the CE of the UE or may be set by RRC configuration of the eNB. A DCI format used by the UE to receive a DL grant may differ according to the TM of the UE. For example, when the UE uses the TM for NC/small CE, it may be assumed that the DL grant is transmitted in DCI format X and, when the UE uses the TM for medium/high CE, it may be assumed that the DL grant is transmitted in DCI format Y. Information about an RS (e.g., a CRS or a DMRS) used by the UE to receive the PDSCH may be configured for the UE through an RRC signal or DCI. That is, the UE may have the same TM regardless of the RS used to receive the PDSCH.

PUSCH transmission may also be similarly applied. That is, a PUSCH TM of the UE may include a TM for NC/small CE and a TM for medium/high CE. The TM of the UE may be automatically determined according to the CE of the UE or may be set by RRC configuration of the eNB. The DCI format used by the UE to receive the DL grant may differ according to the TM of the UE. For example, when the UE uses the TM for NC/small CE, it may be assumed that the UL grant is transmitted in DCI format P and, when the UE uses the TM for medium/high CE, it may be assumed that the UL grant is transmitted in DCI format Q.

Option 2

A PDSCH TM of the UE may include two modes. One is a TM (e.g., transmit diversity using space frequency block coding (SFBC) transmission) using the CRS as the RS used to receive the PDSCH and the other is a TM using the DMRS as the RS used to receive the PDSCH. The UE may receive a TM configured therefor by RRC configuration of the eNB. In this case, the DCI format used by the UE to receive the DL grant may differ according to the CE level of the UE rather than the TM configured for the UE by the eNB. For example, when the CE level of the UE is NC/small CE, it may be assumed that DCI format X is used and, when the CE level of the UE is medium/high CE, it may be assumed that DCI format Y is used. Alternatively, although the UE always uses a specific DCI format, content constituting the DCI format and the length of DCI may differ according to the CE level of the UE. For example, when the CE level of the UE is NC/small CE, the UE may assume that the length of the DCI format received thereby is N1 and, when the CE level of the UE is medium/high CE, the UE may assume that the length of the DCI format received thereby is N2.

In PUSCH transmission, only one mode may be present for the PUSCH TM of the UE. A DCI format used by the UE to receive a UL grant may differ according to the CE level of the UE. For example, when the CE level of the UE is NC/small CE, it may be assumed that the DCI format P is used and, when the CE level of the UE is medium/high CE, it may be assumed that DCI format Q is used. Alternatively, although the UE always uses a specific DCI format, content constituting the DCI format and the length of DCI may differ according to the CE level of the UE. For example, when the CE level of the UE is NC/small CE, the UE may assume that the length of the DCI format received thereby is M1 and, when the CE level of the UE is medium/high CE, the UE may assume that the length of the DCI format received thereby is M2.

Option 3

The PDSCH TM of the UE may include four modes: 1) a TM for an NC/small CE level, in which the PDSCH is transmitted based on the CRS, 2) a TM for a medium/high CE level, in which the PDSCH is transmitted based on the CRS, 3) a TM for an NC/small CE level, in which the PDSCH is transmitted based on the DMRS, and 4) a TM for a medium/high CE level, in which the PDSCH is transmitted based on the DMRS. The UE may receive a TM thereof by RRC configuration of the eNB. The UE may assume that DCI format X is used to receive the DL grant with respect to 1) the TM for an NC/small CE level, in which the PDSCH is transmitted based on the CRS and 3) the TM for an NC/small CE level, in which the PDSCH is transmitted based on the DMRS. The UE may also assume that DCI format Y is used to receive the DL grant with respect to 2) the TM for a medium/high CE level, in which the PDSCH is transmitted based on the CRS and 4) the TM for a medium/high CE level, in which the PDSCH is transmitted based on the DMRS.

In the case of PUSCH transmission, the PUSCH TM of the UE may include a TM for NC/small CE and a TM for medium/high CE. The TM of the UE may be automatically determined according to the CE of the UE or may be set by RRC configuration of the eNB. The DCI format used by the UE to receive the UL grant may differ according to the TM of the UE. For example, when the UE uses the TM for NC/small CE, it may be assumed that the UL grant is transmitted in DCI format P and, when the UE uses the TM for medium/high CE, it may be assumed that the UL grant is transmitted in DCI format Q.

DCI format X, DCI format Y, DCI format P, and DCI format Q may be referred to by other names. Regardless of name, a DCI format used for a DL grant for CE Mode A, a DCI format used for a DL grant for CE Mode B, a DCI format used for a UL grant for CE Mode A, and a DCI format used for a UL grant for CE Mode B may correspond to DCI format X, DCI format Y, DCI format P, and DCI format Q, respectively.

As described earlier, the DCI format or DCI content may be differently configured according to the CE level of the UE. For example, the DCI format or DCI content used when the CE level of the UE is NC/small CE may be different from the DCI format or DCI content used when the CE level of the UE is medium/high CE.

Figure 8:
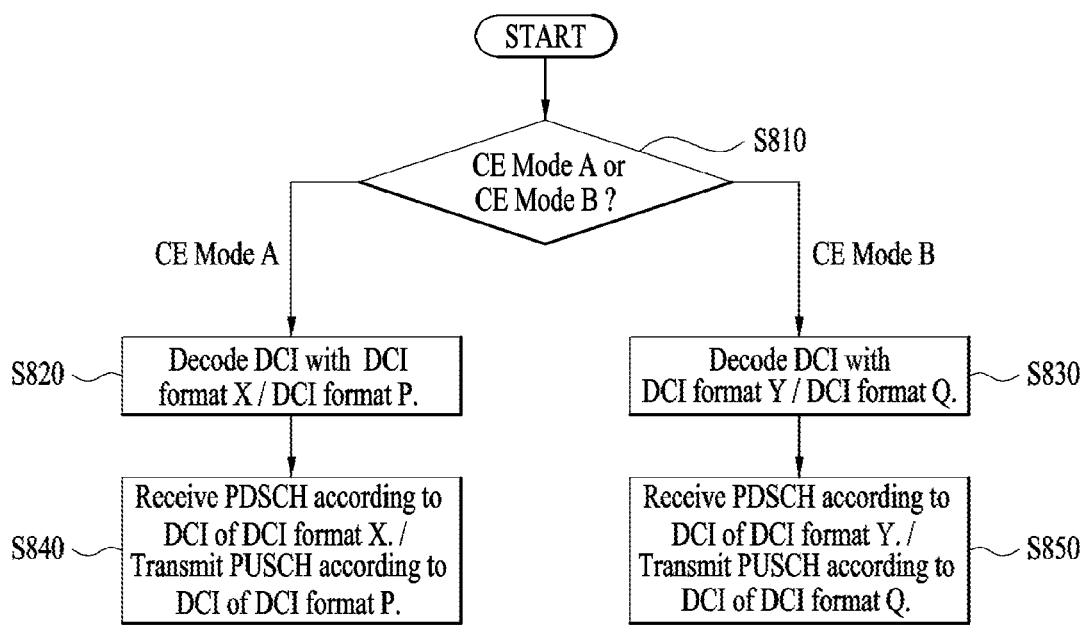
FIG. 8 illustrates a DCI transmission/reception method according to an embodiment of the present invention.

FIG. 8 illustrates a DCI transmission/reception method according to an embodiment of the present invention.

As mentioned in Option A to Option C, a different DCI format may be applied to transmission/reception of a DL grant according to CE mode. The eNB may differently configure DCI for the DL grant according to the CE mode of the UE and then transmit the DCI. The UE attempts to decode the DCI (transmitted through an M-PDCCH) under the assumption that the DCI is transmitted in a DCI format according to a CE mode thereof. The UE attempts to decode the DCI corresponding to the CE mode thereof according to whether the CE mode thereof is CE mode A or CE mode B (S810). For example, when the CE mode of the UE is CE Mode A, the UE may obtain the DL grant by decoding the DCI carried by the M-PDCCH using DCI format X, i.e., according to DCI format X, (S820) and receive a PDSCH according to the DL grant (S840). On the other hand, when the CE mode of the UE is CE Mode B, the UE may obtain the DL grant by decoding the DCI carried by the M-PDCCH using DCI format Y, i.e., according to DCI format Y, (S830) and receive the PDSCH according to the DL grant (S850).

As mentioned in Option A to Option C, a different DCI format may be applied to transmission/reception of a UL grant according to the CE mode. The eNB may differently configure DCI for a UL grant according to the CE mode of the UE and then transmit the DCI. The UE attempts to decode the DCI (transmitted through the M-PDCCH) under the assumption that the DCI is transmitted in a DCI format according to a CE mode thereof. The UE attempts to decode the DCI corresponding to the CE mode thereof according to whether the CE mode thereof is CE mode A or CE mode B (S810). For example, when the CE mode of the UE is CE Mode A, the UE may obtain the DL grant by decoding the DCI carried by the M-PDCCH using DCI format P, i.e., according to DCI format P, (S820) and transmit a PUSCH according to the DL grant (S840). On the other hand, when the CE mode of the UE is CE Mode B, the UE may obtain the UL grant by decoding the DCI carried by the M-PDCCH using DCI format Q, i.e., according to DCI format Q, (S830) and receive the PDSCH according to the UL grant (S850).

Upon successfully performing an RACH procedure, the UE may determine that a CE level associated with a PRACH resource set is a CE level thereof. The UE may determine an (initial) CE mode thereof according to the CE level thereof. The UE and the eNB may determine the CE level of the UE based on a PRACH resource used to successfully receive an RACH preamble of the UE. For example, for the UE of an NC/small CE level, the CE mode may be configured or determined to be CE mode A and, for the UE of a medium/high CE level, the CE mode may be configured or determined to be CE mode B. The CE mode for the UE may be configured or reconfigured through an RRC signal transmitted by the eNB.

According to the CE level or CE mode, fields constituting the DL grant and the UL grant are configured as follows.

DL Grant

Narrowband Index

In NC/small CE, an indication indicating a location of a narrowband used to transmit a PDSCH may be included in DCI. The indication or field may always be present in the DCI regardless of same-narrowband scheduling and/or cross-narrowband scheduling. Then, even when same-narrowband scheduling is performed, the field is present in the DCI. The eNB which performs same-narrowband scheduling may set, through the DCI, an index of the narrowband in which the PDSCH is transmitted to be the same narrowband as a narrowband in which the M-PDCCH is transmitted and indicate the narrowband index to the UE.

In medium/high CE, only same-narrowband scheduling may be determined to always be supported. Then, in medium/high CE, a narrowband index field may be excluded from the DCI.

PRB Assignment in Narrowband

In the case of NC/small CE, information about the size of a PRB (i.e., the number of PRBs) and the location of the PRB in which the PDSCH is transmitted in the indicated narrowband as described above may be included in the DCI.

In the case of medium/high CE, information about PRB assignment in the narrowband may be excluded from the DCI under the assumption that the PDSCH is always transmitted in all PRBs in the narrowband in order to minimize the number of repetitions of the PDSCH.

Number of Repetitions of PDSCH

In the case of NC/small CE, information about the number of repetitions of the PDSCH may be transmitted in the DCI. For commonality of DCI formats, a field indicating the number of repetitions of the PDSCH may always be present in the DCI even when the CE level of the UE is NC and therefore the PDSCH need not be repeated. When it is not necessary to repeat the PDSCH, the number of repetitions of the PDSCH may be set to 1 in the DCI and may be provided to the UE.

The field indicating the number of repetitions of the PDSCH may be included in the DCI even in the case of medium/high CE.

Modulation and Coding Scheme (MCS) Index

In the case of NC/small CE, information about an MCS through which the PDSCH is transmitted may be transmitted in the DCI. An MCS table for NC/small CE may be differently configured from a legacy MCS table (e.g., a CQI table disclosed in 3GPP TS 36.213 Rel-12).

An MCS index field may be included in the DCI even in the case of medium/high CE. An MCS table for medium/high CE may be differently configured from the legacy MCS table.

HARQ Process Number

In the case of NC/small CE, a plurality of HARQ processes may be supported. For example, for NC/small CE, a maximum of 8 HARQ processes or 8 or less HARQ processes may be supported. In this case, a HARQ process number may be indicated by the DCI.

In the case of medium/high CE, the same PDSCH is repeatedly transmitted in multiple subframes so that it may be improper to support a plurality of HARQ processes. Accordingly, a HARQ process number field may be excluded from the DCI.

New Data Indicator (NDI)

In the case of NC/small CE, an indication indicating whether a scheduled PDSCH is a first transmitted PDSCH or a retransmitted PDSCH may be provided to the UE through the DCI.

Even in the case of medium/high CE, an NDI field may be included in the DCI.

TPC Command for PUCCH

In the case of NC/small CE, a transmit power control (TPC) command for a PUCCH transmitted by the UE may be provided to the UE through the DCI.

In the case of medium/high CE, it may be assumed that the UE transmits the PUCCH always with a maximum transmit power. Therefore, a TPC command field for the PUCCH may be excluded from the DCI.

In order for the eNB to successfully receive PUCCHs which are transmitted through code division multiplexing (CDM) by multiple UEs, it is desirable that powers of the PUCCHs which are transmitted by the multiple UEs and received by the eNB be similar. Accordingly, even an MTC UE requiring CE may be requested to perform TPC. In this case, a TPC command field for a PUCCH present in a legacy DL grant may be configured to perform relative power setting for the transmit power of a current PUCCH. However, it may be improper for the MTC UE which transmits and receives data at very rare intervals to control power by performing relative power setting based on the transmit power of a previous PUCCH. Accordingly, the present invention proposes that a TPC command for a PUCCH transmitted through the DCI cause the UE to perform absolute power setting. For example, the TPC command field for the PUCCH may be configured as a value of the transmit power of the UE compared with the maximum transmit power of the UE. Alternatively, in the case of medium/high CE, the TPC command for controlling the transmit power of the PUCCH of the UE may be performed through additional DCI for TPC of the UE as in DCI format 3/3A, without being transmitted through a DL grant.

Alternatively, whether the TPC command for the PUCCH is configured to cause the UE to perform relative power setting for the transmit power of the current PUCCH or absolute power setting may be configured for the UE through higher layer signaling.

Redundancy Version (RV)

In the case of NC/small CE, the number of repetitions of the PDSCH transmitted by the UE may be 1 or a small number. Accordingly, in the case of PDSCH transmission which performs asynchronous HARQ retransmission, an RV value which is used for PDSCH transmission as in a legacy scheme may be indicated to the UE through a DL grant.

In the case of medium/high CE, when the PDSCH is transmitted once, the PDSCH may be repeatedly transmitted through a plurality of subframes. In this case, an RV value applied to the PDSCH transmitted in each subframe within the multiple subframes in which the PDSCH is transmitted may be determined to be a (predetermined) pattern. Then, it is unnecessary to indicate the RV value applied to the PDSCH through each DL grant. Accordingly, in the case of medium/high CE, an RV field may be excluded from the DL grant.

UL Grant

Narrowband Index

In the case of NC/small CE, an indication indicating a location of a narrowband used to transmit a PUSCH may be included in DCI. The indication or field may always be present in the DCI regardless of same-narrowband scheduling and/or cross-narrowband scheduling. Then, even when same-narrowband scheduling is performed, the field is present in the DCI. The eNB which performs same-narrowband scheduling may set, through the DCI, an index of the narrowband which should be used by the UE to transmit the PUSCH is set to be the same narrowband as a narrowband in which the M-PDCCH is transmitted and indicate the narrowband index to the UE.

In medium/high CE, only same-narrowband scheduling may be determined to always be supported. Then, in medium/high CE, a narrowband index field may be excluded from the DCI.

Herein, same-narrowband scheduling may mean that 1) the PUSCH is transmitted in a narrowband in which the UE has previously transmitted the PUSCH without changing a narrowband (or the location of the narrowband) in which the UE transmits the PUSCH, or 2) the PUSCH is transmitted in a UL narrowband linked with a DL narrowband in which the M-PDCCH is transmitted.

PRB Assignment in Narrowband

In the case of NC/small CE, information about the number and locations of PRBs in which the PUSCH is transmitted in the indicated narrowband as described above may be included in the DCI.

In the case of medium/high CE, the PUSCH may be determined to be transmitted with a maximum power of the UE through one PRB, which is a minimum unit capable of transmitting the PUSCH, in order to minimize the number of repetitions of the PUSCH. In this case, only information about the location of one PRB for transmitting the PUSCH may be included in a PRB assignment field in a narrowband. In other words, only information as to which PRB among PRBs in the narrowband is used to transmit the PUSCH may be included in the PRB assignment field. For example, the PRB assignment field included in the UL grant may indicate the location of one PRB in which the PUSCH is transmitted in a narrowband of 6 PRBs.

Number of Repetitions of PUSCH

In the case of NC/small CE, information about the number of repetitions of the PUSCH may be transmitted in the DCI. For commonality of DCI formats, a field indicating the number of repetitions of the PUSCH may be present in the DCI even when the CE level of the UE is NC and therefore the PUSCH need not be repeated. When it is not necessary to repeat the PUSCH, the number of repetitions of the PUSCH may be set to 1 in the DCI and may be provided to the UE.

The field indicating the number of repetitions of the PUSCH may be included in the DCI even in the case of medium/high CE.

Modulation and Coding Scheme (MCS) Index

In the case of NC/small CE, information about an MCS through which the PUSCH is transmitted may be transmitted in the DCI. An MCS table for NC/small CE may be differently configured from the legacy MCS table (e.g., the CQI table disclosed in 3GPP TS 36.213 Rel-12).

An MCS index field may be included in the DCI even in the case of medium/high CE. An MCS table for medium/high CE may be differently configured from the legacy MCS table.

New Data Indicator (NDI)

In the case of NC/small CE, an indication indicating whether a scheduled PUSCH is a first transmitted PUSCH or a retransmitted PUSCH may be provided to the UE through the DCI.

Even in the case of medium/high CE, an NDI field may be included in the DCI.

TPC Command for Scheduled PUSCH

In the case of NC/small CE, a TPC command for a PUSCH scheduled and transmitted by the UE may be provided to the UE through the DCI.

In the case of medium/high CE, it may be assumed that the UE transmits the PUSCH always with a maximum transmit power in order to minimize the number of repetitions of the PUSCH. In this case, a TPC command field for the scheduled PUSCH may be excluded from the DCI. Alternatively, the TPC command field for the scheduled PUSCH may be included in the DCI in order to reduce the number of blinding decoding operations of the UE by maintaining the same length of the UL grant as the length of the DL grant.

CSI Request

In the case of NC/small CE, a CSI request field may be transmitted in the UL grant in order to perform an aperiodic CSI request.

Generally, medium/high CE is applied because reception intensity of a signal is weak. Accordingly, in the case of medium/high CE, since reception intensity of an RS is weak, if only an RS in a single TTI is used, measurement accuracy is reduced as compared with a legacy scheme. On the other hand, if measurement is performed by combining RSs transmitted for a long time in order to increase measurement accuracy, since a channel environment varied while RSs used for measurement are collected, measurement may be meaningless. Accordingly, in the case of medium/high CE, CSI measurement accuracy is lowered. In the case of medium/high CE, since a PUSCH carrying aperiodic CSI will be transmitted throughout a long time, a delay until CSI measured by the UE is reflected may be increased and efficiency of CSI measurement may be lowered. Accordingly, in the case of medium/high CE, the CSI request field may be excluded from the UL grant.

SRS Request

In the case of NC/small CE, an SRS request field for requesting that the UE transmit an SRS may be included in the UL grant.

In the case of medium/high CE, on the other hand, measurement accuracy through the SRS is lowered for the same reason as reduction in measurement accuracy of the CSI. In addition, a delay until a measured value is factored into UL transmission is increased and, due to rare transmission of UL data to which medium/high CE is applied, efficiency of channel measurement through the SRS may be lowered. Accordingly, in the case of medium/high CE, the SRS request field may be excluded from the UL grant.

In the case of NC/small CE, the UE is notified of a TPC command for a PUCCH/PUSCH transmitted by the UE through the DCI. A TPC command for a PUCCH in a legacy DL grant may configure a field so as to perform relative power setting for the transmit power of a current PUCCH. However, it may be improper for the MTC UE which transmits and receives data at very rare intervals to perform relative power setting based on the transmit power of a previous PUCCH through the DL grant and/or the UL grant. Accordingly, the present invention proposes configuring the TPC using the DL grant and/or the UL grant although a PDSCH/PUSCH which will be scheduled to the UE is not present.

To this end, even when there is no data that the eNB will actually schedule to the UE, the eNB should transmit the DL grant and/or the UL grant to the UE. In this case, in order to prevent the PDSCH/PUSCH from being unnecessarily scheduled to the UE, the eNB may transmit the DL grant and/or the UL grant which does not actually schedule the PDSCH/PUSCH. To transmit the DL grant and/or the UL grant without actually scheduling the PDSCH/PUSCH, the eNB may set an RB assignment field (i.e., a PRB assignment field) so that the size of RBs (i.e., the number of RBs) indicated by the RB assignment field is 0. For example, the eNB may set the RB assignment field so that the size of RBs indicated by the RB assignment field of the UL grant is 0. Alternatively, to transmit the DL grant and/or the UL grant without actually scheduling the PDSCH/PUSCH, the eNB may transmit the DCI by setting all bits of the RB assignment field to 1. According to the current standard document, a state in which all bits of the RB assignment field are 1 is an unused state. Accordingly, the eNB may perform invalid RB assignment by (indicating that data is new data through an NDI field and) setting all bits of the RB assignment field in the UL grant to 1. In this case, the UE may recognize that corresponding DCI is valid although the DCI does not actually schedule the PDSCH/PUSCH and perform TPC for the PUSCH/PUCCH according to the TPC field in the DCI. Alternatively, in order to determine that the DCI is valid for TPC although the DCI does not actually schedule the PDSCH/PUSCH, if a condition in which the size of RBs indicated by the RB assignment field is 0 or a condition in which all bits of the RB assignment field are set to 1 is satisfied even when the NDI field is set to 1, i.e., even when new data is indicated, the UE may recognize that the corresponding DCI is valid although the DCI does not actually schedule the PDSCH/PUSCH and perform TPC for the PUSCH/PUCCH according to the TPC field in the DCI. In the present invention, the DCI in which the TPC field is valid although the DCI does not actually schedule data is referred to as a TPC grant, for convenience of description. Such a TPC grant may mean not only the DCI of the proposed form but also unicast or groupcast/broadcast DCI targeted at TPC rather than data scheduling.

Alternatively, for PUCCH/PUSCH TPC, a TPC field in DCI which actually schedules data (e.g., DCI which assigns a PRB location at which the RB assignment field is valid) may be configured to perform relative power setting for the transmit power of a current PUCCH. Alternatively, it may be assumed that the TPC field of the TPC grant performs absolute power setting. In this case, the UE may reset a PUCCH power value which has been accumulated to a power value which is configured through the TPC field. For example, the UE may reset the PUCCH power value which is obtained by accumulating relative power setting values through the PUCCH TPC to a value configured in the TPC field in the TPC grant when the TPC grant is received. Next, the UE may perform PUCCH power accumulation based on the reset value.

A DCI format that the UE monitors includes the following DCI formats.

DCI_1A: A DCI format for scheduling a PDSCH transmitted using a transmission scheme used in TM 1 and TM 2 among TMs defined up to now.

DCI_6: A DCI format for scheduling a PDSCH transmitted using a transmission scheme used in TM 6 among TMs defined up to now.

DCI_9: A DCI format for scheduling a PDSCH transmitted using a transmission scheme used in TM 9 among TMs defined up to now.

DCI_TPC: A DCI format transmitted to a plurality of UEs for UL power control as in DCI format 3/3A among TMs defined up to now or a DCI format used for DCI for other purposes (e.g., bundled A/N transmission or an enhanced PHICH (EPHICH)). It may be assumed that DCI_TPC is scrambled with other RNTIs rather than a C-RNTI.

DCI_UL (=DCI format 0): A DCI format for scheduling a PUSCH.

The size of DCI that the UE monitors may be as follows with respect to each DCI format according to each case described below.

<Case 1>

When the UE monitors both a UE-specific search space (USS) and a common search space (CSS), a DCI format that the UE monitors in the USS and a DCI format that the UE monitors in the CSS may be as follows. Alternatively, even when a decoding candidate (e.g., a PDCCH/EPDCCH/M-PDCCH candidate (hereinafter, an M-PDCCH candidate)) in the USS is different from an M-PDCCH candidate in the CSS, DCI formats are used as follows. When the candidate in the USS is different from the candidate in the CSS, this may mean that, in the case of the USS, a hashing function is used for a UE-ID based (M-PDCCH) candidate and, in the case of the CSS, the hashing function applied to a candidate is not based on the UE-ID and may be cell-specific. Alternatively, the hashing function is not used in the case of the CSS.

DCI Format Monitored in USS

DCI_1A, DCI_6, or DCI_9

DCI_UL

DCI Format Monitored in CSS

DCI_TPC

DCI_1A (this is the case of being scrambled with the C-RNTI and may not be supported in some cases)

The size of each DCI format that the UE monitors may be as follows.

To reduce blind decoding complexity of the UE, it may be assumed that only one DCI size can be monitored in the USS. A situation in which the UE monitors one or more DCI sizes is described in Case 1-2.

To cause the UE to monitor only one DCI size in the USS, 1) the eNB may apply zero padding to DL grant DCI or DCI_UL so that the DL grant DCI (a DCI format that the UE monitors according to a scheme of transmitting a PDSCH to the UE among DCI_1A, DCI_6, or DCI_9) transmitted in the USS is equal in size to DCI_UL. If zero padding is applied according to the method of 1), for example, if UE1 monitors DCI_1A and DCI_UL and UE2 monitors DCI_9 and DCI_UL, then DCI_1A and DCI_UL monitored by UE1 are equal in size and DCI_9 and DCI_UL monitored by UE2 are equal in size. However, DCI_1A monitored by UE1 and DCI_9 monitored by UE2 may be different in size.

Alternatively, to cause the UE to monitor only one DCI size in the USS, 2) the eNB may apply zero padding to DL grant DCI and/or DCI_UL of a format that the UE monitors according to a transmission scheme to the UE so that the DL grant DCI having a possibility of being transmitted in the USS, for example, DCI_1A, DCI_6, and DCI_9, and DCI_UL may be equal in size. That is, the UE may determine a DCI format according to a TM configured therefor. In this case, the size of the DCI may be fixed to one value. If zero padding is applied according to the method of 2), for example, if UE1 monitors DCI_1A and DCI_UL and UE2 monitors DCI_9 and DCI_UL, then DCI_1A and DCI_UL monitored by UE1 and DCI_9 and DCI_UL monitored by UE2 are all equal in size. A DCI size which is a criterion of zero padding may be determined based on the largest DCI format.

To cause the UE to monitor only one DCI size even in the CSS, the eNB may apply zero padding to DCI_TPC or DCI_1A so that DCI_TPC and DCI_1A are equal in size. If DCI_UL is also monitored in the CSS, zero padding may be applied to DCI_TPC, DCI_1A, and/or DCI_UL so that DCI_TPC, DCI_1A, and DCI_UL transmitted in the CSS may be equal in size.

<Case 1-2: Two DCI Sizes are Monitored. This Case Corresponds to a Suboption of Case 1>

In a description of the following operations, "=" means that DCI formats on the right and left sides of "=" are equal in size.

Option 1: DCI_TPC=DCI_1A and DL grant and UL grant are different in size.

Option 1-1: When the UE is configured as TM 6 or TM 9 (or a TM corresponding to TM 6 or TM 9), 'DCI_1A=DCI_0' may be different in size from 'DCI_6 or DCI_9'. The UE monitors two DCI sizes, i.e., one for a DL grant and the other for a UL grant.

Option 1-2: (Through zero padding) DCI_1A=DCI_6=DCI_9. DCI_1A=DCI_6=DCI_9 may be different in size from DCI_0. Irrespective of the TM, the UE monitors two DCI sizes, i.e., one for a DL/TPC grant (i.e., DL grant and/or TPC grant) and the other for the UL grant.

Option 1-3: (Except for DCI_TPC=DCI_1A) all DCI sizes may differ. Regardless of the TM, the UE monitors two DCI sizes for unicast.

<Case 2>

When the UE is set or configured to monitor only the USS (or only one SS without distinguishing between the USS and the CSS), the UE monitors the following DCI formats in one SS. The case in which the UE monitors only the USS or only one SS may be appreciated as an option for detecting multiple RNTIs for one candidate. For example, the UE may decode one M-PDCCH candidate into each of multiple RNTIs.

DCI_1A, DCI_6, or DCI_9
DCI_UL
DCI_TPC

In this case, each size of a DCI format that the UE monitors in a corresponding SS may be as follows.

To lower blind decoding complexity of the UE, the UE may monitor only one DCI size.

To cause the UE to monitor only one DCI size, 1) the eNB may apply zero padding or repetition to DL grant DCI, DCI_TPC, and/or DCI_UL so that DL grant DCI (a DCI format that the UE monitors according to a scheme of transmitting a PDSCH to the UE among DCI_1A, DCI_6, or DCI_9) may be equal in size to DCI_UL. Alternatively, the repetition may be applied until the DCI size becomes equal to a target size by repeating one or some fields in the grant DCI, DCI_TPC, and/or DCI_UL. If the method of 1) is applied, for example, if UE1 monitors DCI_1A, DCI_UL, and DCI_TPC and UE2 monitors DCI_9, DCI_UL, and DCI_TPC, the DCI sizes of the three DCI formats monitored by UE1 are equal and the DCI sizes of the three DCI formats monitored by UE2 are equal but the DCI sizes monitored by UE1 may be different from the DCI sizes monitored by UE2. In this case, UEs using the same TPC-PUSCH-RNTI and/or TPC-PUCCH-RNTI may be configured such that the PDSCH may be transmitted using the same transmission scheme. The UE assumes that DCI_TPC is equal in size to UL/DL grant by assuming that TMs configured for UEs belonging to the same group are equal. This means that, when a TM is reconfigured, a DCI size for TPC or other purposes varies.

To cause the UE to monitor only one DCI size, 2) zero padding may be applied to DL grant DCI, DCI_TPC and/or DCI_UL so that DCI_1A, DCI_6, DCI_9, DCI_UL, and DCI_TPC are equal in size. If zero padding is applied according to the method of 2), for example, if UE1 monitors DCI_1A, DCI_TPC, and DCI_UL and UE2 monitors DCI_9, DCI_TPC, and DCI_UL, DCI_1A, then DCI_1A, DCI_TPC, and DCI_UL monitored by UE1 and DCI_9, DCI_TPC, and DCI_UL monitored by UE2 are all equal in size. In this case, even when transmission schemes used to transmit the PDSCH to the two UEs are different, the two UEs may use the same TPC-PUSCH-RNTI and/or TPC-PUCCH-RNTI.

<Case 2-2: 2 or 3 DCI Sizes are Monitored. This Case Corresponds to a Suboption of Case 2>

In a description of the following operations, "=" means that DCI formats on the right and left sides of "=" are equal in size Option 1: The size of DCI_TPC is different from the size of DCI_6 or DCI_9.

When the UE is configured as TM 6 or TM 9 (or a TM corresponding to TM 6 or TM 9), the UE monitors DCI_TCP/DCI_0 and DCI_6 (or DCI_9). Two DCI sizes are monitored. Otherwise, one DCI size is monitored.

Option 2: DCI_TPC=DCI_1A and DL grant and UL grant are different in size.

Option 2-1: When the UE is configured as TM 6 or TM 9 (or a TM corresponding to TM 6 or TM 9), 'DCI_1A=DCI_0' may be different in size from 'DCI_6 or DCI_9'. The UE monitors three DCI sizes, i.e., one for a DCI_TPC, another for a UL grant, and the other for a DL grant.

Option 2-2: (Through zero padding) DCI_1A=DCI_6=DCI_9. DCI_1A=DCI_6=DCI_9 may be different in size from DCI_0. Irrespective of the TM, the UE monitors two DCI sizes, i.e., one for a DL/TPC grant (i.e., DL grant and/or TPC grant) and the other for the UL grant.

Option 2-3: (Except for DCI_TPC=DCI_1A) all DCI sizes may differ. Regardless of the TM, the UE monitors three DCI sizes for unicast.

Figure 9:
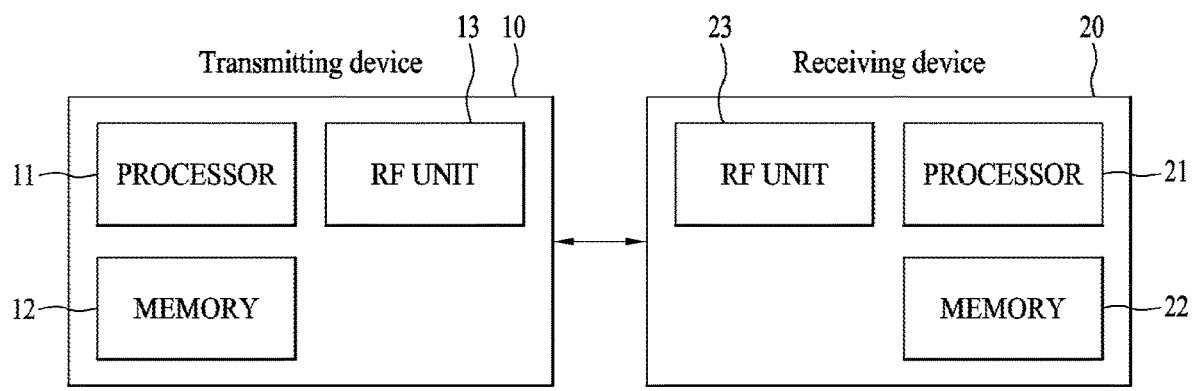
FIG. 9 is a block diagram illustrating elements of a transmitting device 10 and a receiving device 20 for implementing the present invention.

FIG. 9 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may determine or configure a CE level, a CE mode, and/or a TM of the UE according to any one of the embodiments described in Section A to Section C. The UE processor of the present invention may determine or configured the CE level, the CE mode, and/or the TM of the UE according to any one of the embodiments described in Section A to Section C The eNB processor may control the eNB RF unit to provide configuration information about the CE level, the CE mode, and/or the TM of the UE or information about parameters to the UE according to any one of the embodiments described in Section A to Section C. The UE processor may control the UE RF unit to receive the configuration information about the CE level, the CE mode, and/or the TM of the UE or the information about parameters according to any one of the embodiments described in Section A to Section C.

The eNB processor may be configured to set or generate DL grant DCI according to any one of the embodiments described in Section C. For example, the eNB processor may set a DL grant for the UE of CE Mode A according to DCI format X and set a DL grant for the UE of CE Mode B according to DCI format Y. The eNB processor may control the eNB RF unit to transmit the DL grant DCI to the UE through an M-PDCCH. The eNB processor may control the eNB RF unit to transmit a PDSCH to the UE according to the DL grant DCI. The UE processor may be configured to decode or receive the DL grant DCI according to any one of the embodiments described in Section C. For example, when the CE mode of the UE is CE Mode A, the UE processor may be configured to decode/receive the DL grant or the M-PDCCH carrying the DL grant according to DCI format X and when the CE mode of the UE is CE Mode B, the UE processor may be configured to decode/receive the DL grant or the M-PDCCH carrying the DL grant according to DCI format Y. The UE processor may control the UE RF unit to receive the DL grant DCI through the M-PDCCH. The UE processor may control the UE RF unit to receive the PDSCH according to the DL grant DCI.

The eNB processor may be configured to set or generate UL grant DCI according to any one of the embodiments described in Section C. For example, the eNB processor may set a UL grant for the UE of CE Mode A according to DCI format Q and set a UL grant for the UE of CE Mode B according to DCI format P. The eNB processor may control the eNB RF unit to transmit the UL grant DCI to the UE through the M-PDCCH. The eNB processor may control the eNB RF unit to receive the PUSCH from the UE according to the UL grant DCI. The UE processor may be configured to decode or receive the UL grant DCI according to any one of the embodiments described in Section C. For example, when the CE mode of the UE is CE Mode A, the UE processor may be configured to decode/receive the UL grant or the M-PDCCH carrying the UL grant according to DCI format P and when the CE mode of the UE is CE Mode B, the UE processor may be configured to decode/receive the UL grant or the M-PDCCH carrying the UL grant according to DCI format Q. The UE processor may control the UE RF unit to receive the UL grant DCI through the M-PDCCH. The UE processor may control the UE RF unit to transmit the PUSCH according to the UL grant DCI.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a BS, a UE, or other devices in a wireless communication system.

What is claimed is:

1. A method performed by a user equipment (UE) in a wireless communication system, the method comprising:
   determining a coverage enhancement (CE) mode as one of a plurality of predetermined CE modes comprising a CE mode A and a CE mode B;
   receiving downlink control information (DCI) related to scheduling a data channel, wherein a format of the DCI is related to the CE mode; and
   communicating the data channel based on the DCI,
   wherein determining the CE mode comprises: determining the CE mode based on an index of a physical random access channel (PRACH) resource set comprising a PRACH resource on which a PRACH is transmitted,
   wherein the PRACH resource set is related to a CE level for the UE,
   wherein the index is determined as one of 0, 1, 2, 3,
   wherein based on the index being determined as 0, the CE mode is determined as the CE mode A,
   wherein based on the index being determined as 1, the CE mode is determined as the CE mode A,
   wherein based on the index being determined as 2, the CE mode is determined as the CE mode B, and
   wherein based on the index being determined as 3, the CE mode is determined as the CE mode B.

2. The method of claim 1, wherein based on the data channel being a physical downlink shared channel (PDSCH) and the CE mode being determined as the CE mode A, the format of the DCI is a first format,
   based on the data channel being the PDSCH and the CE mode being determined as the CE mode B, the format of the DCI is a second format, and
   wherein the DCI with the first format and the second format of the DCI with the first format are different in: (i) a physical resource block (PRB) assignment field for downlink reception, (ii) a hybrid automatic repeat request (HARQ) process number field, (iii) a transmit power control (TPC) command field for a physical uplink control channel (PUCCH), and (iv) a redundancy version (RV) field.

3. The method of claim 2, wherein the DCI with the first format comprises (i) the PRB assignment field, (ii) the HARQ process number field, (iii) the TPC command for the PUCCH, and (iv) the RV field, and
   wherein each of (i) the PRB assignment field for the downlink reception, (ii) the HARQ process number field, (iii) the TPC command field for the PUCCH, and the (iv) RV field is not included in the second format of the DCI or is smaller than included in the DCI with the first format.

4. The method of claim 1, wherein based on the data channel being a physical uplink shared channel (PUSCH) and the CE mode being determined as the CE mode A, the format of the DCI is a third format,
   based on the data channel being the PUSCH and the CE mode being determined as the CE mode B, the format of the DCI is a fourth format, and
   wherein the DCI with the third format and the DCI with the fourth format are different in: (i) a PRB assignment field for uplink transmission, (ii) a TPC command field for the PUSCH, (iii) a channel state information (CSI) request field, and (iv) a sounding reference signal (SRS) request field.

5. The method of claim 4, wherein the DCI with the third format comprises (i) the PRB assignment field for the uplink transmission, (ii) the TPC command field for the PUSCH, (iii) the CSI request field, and (iv) the SRS field, and
   wherein each of (i) the PRB assignment field for the uplink transmission, (ii) the TPC command field for the scheduled PUSCH, (iii) the CSI request field, and (iv) the SRS field is not included in the fourth DCI format or is smaller than included in the DCI with the fourth format.

6. The method of claim 1, wherein the CE mode is related to a machine type communication (MTC).

7. The method of claim 1, wherein determining the CE mode further comprises:
   determining the CE mode as identical to a CE mode indicated by information indicating the CE mode received through a radio resource control (RRC) signal after an RRC connection setup establishment is completed, and
   wherein determining the CE mode based on the PRACH resource set is applied before the RRC connection setup establishment is completed.

8. The method of claim 1, wherein based on the CE mode being determined as CE mode A, a cross-narrowband scheduling is available for the UE,
   wherein based on the CE mode being determined as CE mode B, the cross-narrowband scheduling is not available for the UE, and
   wherein the cross-narrowband scheduling denotes a scheduling method related to the DCI received or transmitted in a first narrowband different from a second narrowband in which the DCI is received.

9. A user equipment (UE) configured to operate in a wireless communication system, the UE comprising:
   a memory; and
   at least one processor coupled with the memory,
   wherein the at least one processor is configured to:
   determine a coverage enhancement (CE) mode as one of a plurality of predetermined CE modes comprising a CE mode A and a CE mode B;
   receive downlink control information (DCI) related to scheduling a data channel, wherein a format of the DCI is related to the CE mode; and
   communicate the data channel based on the DCI,
   wherein the at least one processor is further configured to:
   determine the CE mode based on an index of a physical random access channel (PRACH) resource set comprising a PRACH resource on which a PRACH is transmitted,
   wherein the PRACH resource set is related to a CE level for the UE,
   wherein the index is determined as one of 0, 1, 2, 3,
   wherein based on the index being determined as 0, the CE mode is determined as the CE mode A,
   wherein based on the index being determined as 1, the CE mode is determined as the CE mode A, wherein based on the index being determined as 2, the CE mode is determined as the CE mode B, and wherein based on the index being determined as 3, the CE mode is determined as the CE mode B.

10. A method performed by a base station (BS) in a wireless communication system, the method comprising:

determining a coverage enhancement (CE) mode for a user equipment (UE), wherein the CE mode is determined as one of a plurality of predetermined CE modes comprising a CE mode A and a CE mode B;

transmitting downlink control information (DCI) related to scheduling a data channel, wherein a format of the DCI is related to the CE mode; and communicating the data channel related to the DCI, wherein determining the CE mode comprises:

determining the CE mode based on an index of a physical random access channel (PRACH) resource set comprising a PRACH resource on which a PRACH is received, wherein the PRACH resource set is related to a CE level for the UE, wherein the index is determined as one of 0, 1, 2, 3, wherein based on the index being determined as 0, the CE mode is determined as the CE mode A, wherein based on the index being determined as 1, the CE mode is determined as the CE mode A, wherein based on the index being determined as 2, the CE mode is determined as the CE mode B, and wherein based on the index being determined as 3, the CE mode is determined as the CE mode B.

11. A base station (BS) configured to operate in a wireless communication system, the BS comprising:

a memory; and at least one processor coupled with the memory, wherein the at least one processor is configured to:

determine a coverage enhancement (CE) mode for a user equipment (UE), wherein the CE mode is determined as one of a plurality of predetermined CE modes comprising a CE mode A and a CE mode B;

transmit downlink control information (DCI) related to scheduling a data channel, wherein a format of the DCI is related to the CE mode; and communicate the data channel related to the DCI, wherein the at least one processor is further configured to:

determine the CE mode based on an index of a physical random access channel (PRACH) resource set comprising a PRACH resource on which a PRACH is received, wherein the PRACH resource set is related to a CE level for the UE, wherein the index is determined as one of 0, 1, 2, 3, wherein based on the index being determined as 0, the CE mode is determined as the CE mode A, wherein based on the index being determined as 1, the CE mode is determined as the CE mode A, wherein based on the index being determined as 2, the CE mode is determined as the CE mode B, and wherein based on the index being determined as 3, the CE mode is determined as the CE mode B.

* * * * *